(12) United States Patent
Seki et al.

(10) Patent No.: US 8,954,666 B2
(45) Date of Patent: Feb. 10, 2015

(54) STORAGE SUBSYSTEM

(75) Inventors: Toshiya Seki, Odawara (JP); Takashi Sakaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 983 days.

(21) Appl. No.: 12/527,442

(22) PCT Filed: May 15, 2009

(86) PCT No.: PCT/JP2009/059390
§ 371 (c)(1),
(2), (4) Date: Aug. 17, 2009

(87) PCT Pub. No.: WO2010/131373
PCT Pub. Date: Nov. 18, 2010

(65) Prior Publication Data
US 2011/0153954 A1  Jun. 23, 2011

(51) Int. Cl.
*G06F 3/06* (2006.01)
*G06F 12/08* (2006.01)
(52) U.S. Cl.
CPC .............. *G06F 12/084* (2013.01); *G06F 3/067* (2013.01); *G06F 3/0647* (2013.01); *G06F 3/0634* (2013.01); *G06F 3/062* (2013.01); *G06F 2212/263* (2013.01); *G06F 2212/312* (2013.01); *G06F 12/0866* (2013.01); *G06F 2212/466* (2013.01)
USPC ............ 711/113; 711/114; 711/140; 711/150
(58) Field of Classification Search
None
See application file for complete search history.

(56) References Cited

U.S. PATENT DOCUMENTS

| | | | | |
|---|---|---|---|---|
| 6,073,218 | A * | 6/2000 | DeKoning et al. | 711/150 |
| 6,101,588 | A * | 8/2000 | Farley | 711/168 |
| 6,393,466 | B1 * | 5/2002 | Hickman et al. | 709/214 |
| 7,970,992 | B1 * | 6/2011 | Michael et al. | 711/114 |
| 7,975,018 | B2 * | 7/2011 | Unrau et al. | 709/214 |
| 8,041,735 | B1 * | 10/2011 | Lacapra et al. | 707/783 |
| 2001/0034816 | A1 | 10/2001 | Michael et al. | |
| 2001/0049773 | A1 * | 12/2001 | Bhavsar | 711/147 |
| 2002/0166031 | A1 * | 11/2002 | Chen et al. | 711/141 |
| 2003/0028819 | A1 * | 2/2003 | Chiu et al. | 714/5 |
| 2003/0131192 | A1 * | 7/2003 | Nakamura et al. | 711/114 |
| 2004/0078517 | A1 * | 4/2004 | Kaneko et al. | 711/113 |
| 2004/0117562 | A1 * | 6/2004 | Wu et al. | 711/147 |

(Continued)

FOREIGN PATENT DOCUMENTS

| | | |
|---|---|---|
| EP | 1 818 794 A2 | 8/2007 |
| EP | 1 986 090 A2 | 10/2008 |
| JP | 2008-269424 A | 11/2008 |

*Primary Examiner* — Nathan Sadler
(74) *Attorney, Agent, or Firm* — Mattingly & Malur, PC

(57) ABSTRACT

Provided is a storage subsystem capable of speeding up the input/output processing for a cache memory. Microprocessor Packages manage information related to a VDEV ownership for controlling virtual devices and a cache segment ownership for controlling cache segments in units of Microprocessor Packages, and one Microprocessor among multiple Microprocessors belonging to the determined Microprocessor Package to perform input/output processing for the virtual devices searches cache control information stored in the Package Memory without searching the cache control information in the shared memory, and if data exists in the cache memory, accesses the cache memory, and if it does not, accesses the virtual devices.

5 Claims, 20 Drawing Sheets

(56) References Cited

U.S. PATENT DOCUMENTS

| | | | |
|---|---|---|---|
| 2004/0210713 A1* | 10/2004 | Kanai | 711/113 |
| 2005/0114592 A1* | 5/2005 | Jin et al. | 711/113 |
| 2005/0177684 A1* | 8/2005 | Hoshino et al. | 711/114 |
| 2007/0061518 A1* | 3/2007 | Gotoh | 711/130 |
| 2007/0101082 A1 | 5/2007 | Sugiura et al. | |
| 2008/0183994 A1* | 7/2008 | Maki et al. | 711/162 |
| 2008/0256294 A1* | 10/2008 | Gill | 711/117 |
| 2008/0263190 A1 | 10/2008 | Serizawa et al. | |

* cited by examiner

| VDEV# (101) | MPPK# (102) |
|---|---|
| 0 | 1 |
| 1 | 0 |
| 2 | 6 |
| 3 | 0xFFFF(UNINSTALLED) |
| 4 | 0 |
| : | : |

← T1

(b)

| VDEV# (103) | MPPK# (104) |
|---|---|
| 1 | 0 |
| 2 | 6 |
| 4 | 0 |
| 7 | 0 |
| 9 | 2 |
| : | : |

| CMPK NUMBER – CACHE SEGMENT GROUP NUMBER (105) | MPPK# (106) |
|---|---|
| 0-0 | 0 |
| 0-1 | 1 |
| 0-2 | 2 |
| 0-3 | 3 |
| 0-4 | 0 |
| : | : |

T3

(b)

| MANAGEMENT NUMBER (107) | CMPK NUMBER – CACHE SEGMENT GROUP NUMBER (108) |
|---|---|
| 0 | 0-0 |
| 1 | 0-4 |
| 2 | 0-8 |
| 3 | 1-1 |
| 4 | 1-5 |
| : | : |

T4

STORAGE SUBSYSTEM

TECHNICAL FIELD

The present invention relates to a storage subsystem that performs input/output processing for multiple logical storage systems allocated to storage areas of multiple storage devices.

BACKGROUND ART

A storage subsystem provides multiple logical storage systems allocated to storage areas of multiple storage devices as being recognizable by a host computer, which enables the host computer to perform data input/output processing for the relevant logical storage systems.

If a storage subsystem receives an input/output request from the host computer, a microprocessor installed in the storage subsystem controls the data written to and read from the storage devices or performs other input/output processing, following the input/output request.

Some storage subsystems of this type include multiple microprocessors for performing input/output processing to and from storage devices. A proposed storage system including a storage subsystem of this type, for example, stores cache control information in a shared memory in advance as the control information common to all of the microprocessors, and when receiving an input/output request from the host computer, the microprocessor to perform the relevant input/output processing accesses the shared memory, reads the cache control information, determines with reference to the read cache control information whether the relevant data exists in the cache memory, and accesses the cache memory if the data exists in the cache memory, or accesses the logical storage system if the data does not exist in the cache memory (refer to Patent Document 1).

Patent Document 1: Japanese Patent Application Laid-Open Publication No. 2008-269424

DISCLOSURE OF THE INVENTION

In conventional technology, if an input/output request is made from the host computer to the logical storage system, the microprocessor to perform the input/output processing for the logical storage system is determined with reference to the management table for managing the microprocessors, and therefore, the microprocessor to perform the processing can be easily changed according to the load of the microprocessor.

However, in conventional technology, as cache control information is stored in inexpensive and low-speed shared memories, access to the shared memory takes time, and cache search time becomes overhead. In particular, cost per lead for the shared memory becomes high, which deteriorates the I/O performance.

In this case, instead of storing cache control information in the shared memory, storing cache control information in local memories which are faster than the shared memories can be considered. However, only a specified microprocessor can access the local memories while other microprocessors cannot, which makes it difficult to store cache control information in the local memory.

That is, even if cache control information is stored in a local memory corresponding with each microprocessor, the microprocessors cannot recognize the cache control information of the other microprocessors. Therefore, even if a microprocessor searches the cache memory with reference to the cache control information of the local memory and there is a hit, the other microprocessors cannot confirm the contents, and therefore, they have to access the shared memory where the information shared by all the microprocessors is stored.

Furthermore, as the microprocessor speeds up, if overhead occurs in accessing the shared memory, the I/O performance is pressed even more, and therefore, the number of accesses to the shared memory must be decreased even more.

Taking this into consideration, the present invention is intended to provide a storage subsystem which can speed up the input/output processing for the cache memory.

In order to achieve the above-mentioned object, the present invention is characterized by managing information related to a first ownership for controlling a logical storage area allocated to a storage area of a storage device and a second ownership for controlling a specific cache area in a cache memory per control unit, and by either one of the control units performing input/output processing for the accessible logical storage area or cache area with reference to the information related to the first and second ownerships.

The present invention makes high-speed input/output processing for a cache memory possible.

BRIEF DESCRIPTION OF THE DRAWINGS

FIGS. 3 (3(a) and 3(b)) shows configuration diagrams of VDEV ownership management tables;

FIGS. 4 (4(a) and 4(b)) shows configuration diagrams of cache segment ownership management tables;

BEST MODE FOR CARRYING OUT THE INVENTION

An embodiment is configured of managing information related to the VDEV ownership (first ownership) for controlling a logical storage area and the cache segment ownership (second ownership) for controlling a cache segment per Microprocessor Package (MPPK), and performing input/output processing (access) to an accessible logical storage area or an accessible cache segment with reference to the information related to the ownerships.

Figure 1:
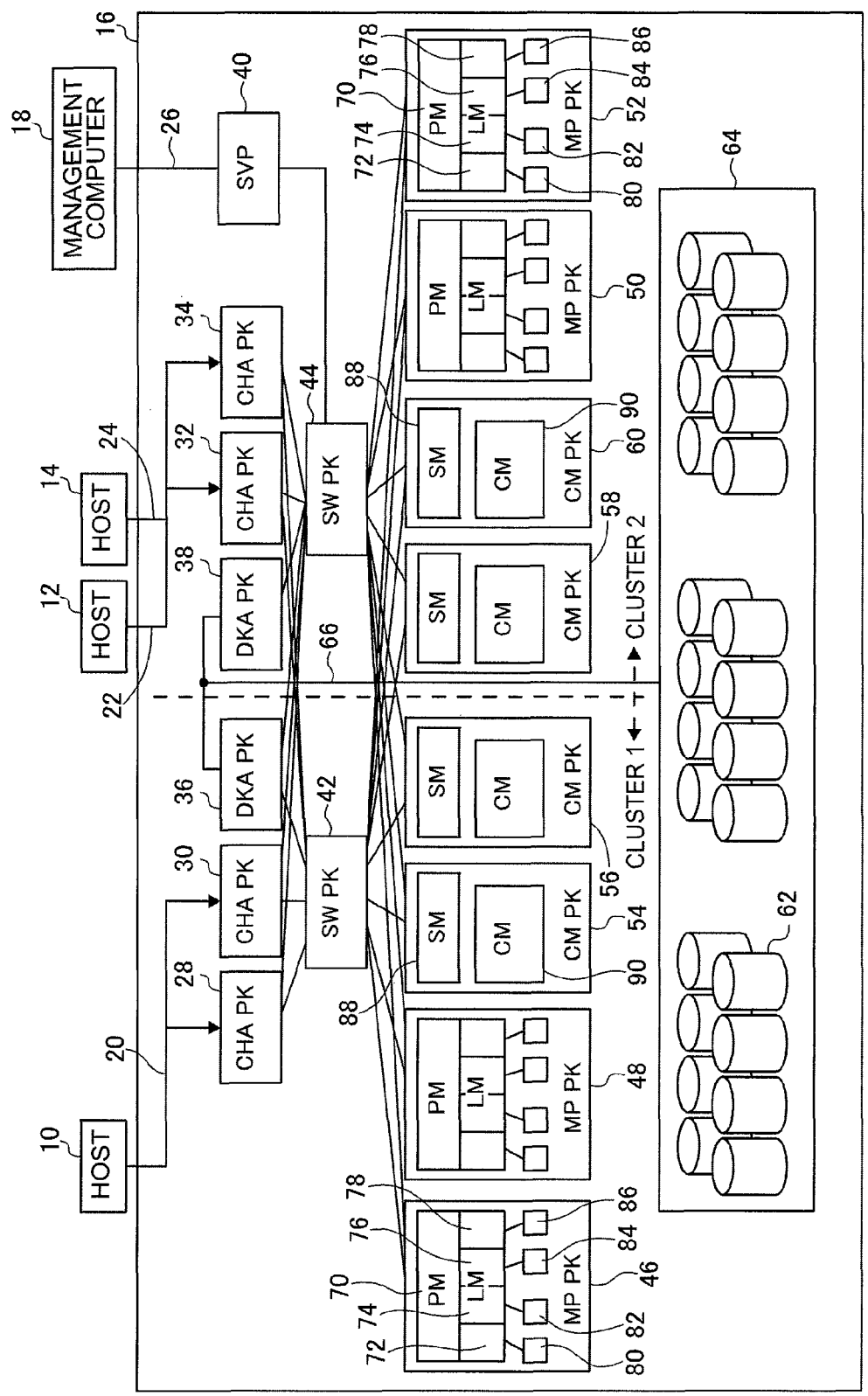
FIG. 1 is a configuration diagram of a storage system using a storage subsystem related to the present invention.

An embodiment of the present invention is described below with reference to the attached drawings. FIG. 1 is a configuration diagram of a storage system as an embodiment of the present invention.

In FIG. 1, the storage system includes multiple host computers 10, 12, 14, a storage subsystem 16, and a management computer 18. The host computers 10, 12 and 14 are connected with the storage subsystem 16 via networks 20, 22, and 24 respectively while the management computer 18 is connected with the storage subsystem 16 via a network 26.

As the networks 20, 22, and 24, for example, SAN (Storage Area Network), LAN (Local Area Network), the Internet, a private line, a public line and others can be used as long as they are the networks capable of data communication. Furthermore, as the protocols in the networks 20, 22, and 24, Fibre Channel protocols and TCP/IP protocols can be used, and arbitrary protocols may also be permitted as long as they are protocols capable of data communication between the host computers 10, 12, 14 and the storage subsystem 16.

In this case, a read request sent from the host computers 10, 12, 14 includes, for example, an LUN (Logical Unit Number) and an LBA (Logical Block Address) where data to be read is managed. Furthermore, a write request sent from the host computers 10, 12, 14 includes, for example, an LUN and an LBA where the relevant data is to be written and the relevant data itself.

The storage subsystem 16 is configured of multiple modules including multiple Channel Adapter Packages (CHA PKs) 28, 30, 32, 34, multiple Disk Adapter Packages (DKA PKs) 36, 38, a Service Processor (SVP) 40, Switch Packages (SW PKs) 42, 44, multiple Microprocessor Packages (MPPKs) 46, 48, 50, 52, multiple Cache Memory Packages (CMPKs) 54, 56, 58, 60, and a storage device 64 configured of multiple HDDs (Hard Disk Drives) 62, and each module is divided into a Cluster 1 and a Cluster 2 as duplicated storage systems or disk array systems.

The Channel Adapter Packages 28 and 30 are connected with the host computer 10 via the network 20, the Channel Adapter Packages 32 and 34 are connected with the host computers 12 and 14 via the networks 22 and 24 respectively, and the Disk Adapter Packages 36 and 38 are connected with each other via the Switch Packages 66 and also connected with the storage device 64. The Channel Adapter Packages 28, 30, the Disk Adapter Package 36, the Microprocessor Packages 46, 48, and the Cache Memory Packages 54, 56 are connected with each other via the Switch Package 42.

Furthermore, the Channel Adapter Packages 32, 34, the Disk Adapter Package 38, the Microprocessor Packages 50, 52, and the Cache Memory Packages 58, 60 are connected with each other via the Switch Package 44. Furthermore, the Service Processor 40 is connected with the Switch Package 44 and also connected with the management computer 18 via the network 26.

The Channel Adapter Packages 28, 30, 32, and 34 are configured as the first interfaces exchanging information with the host computer 10 or the host computers 12 and 14 via the network 20 or the networks 22 and 24 and performing data input/output processing for the host computer 10 or the host computers 12 and 14.

The Disk Adapter Packages 36 and 38 are configured as the second interfaces exchanging information with the storage device 64 via the Switch Package 66 and performing data input/output processing for the HDDs 62 in the storage device 64.

The HDDs 62 are used for storing data that is accessible from the host computers 10, 12 and 14.

The storage subsystem 16 configures a RAID (Redundant Array of Inexpensive Disks) group from a plurality of HDDs 62, and sets one or more logical devices (LDEV: Logical Device) to the RAID group and provides the same to the host computers 10, 12 and 14.

Here, the storage subsystem 16 is able to provide the logical devices (LDEVs) as one or more logical units (LU: Logical Unit) as logical storage areas to be recognized by the host computers 10, 12 and 14.

Moreover, the storage subsystem 16 allocates one or more virtual devices (VDEV: Virtual Device) to the logical devices (LDEVs) and manages the same as a unit of the logical storage areas to be referred to upon microprocessors 80, 82, 84 and 86 accessing a cache memory (CM) 90. In the following embodiments, the explanation is provided using a virtual device (VDEV) as the unit of logical storage areas.

Each of the Microprocessor Packages 46, 48, 50 and 52 is configured of a Package Memory (PM) 70, four local memories 72, 74, 76, 78, and four microprocessors (MP) 80, 82, 84, 86 while each of the Cache Memory Packages 54, 56, 58 and 60 is configured of a shared memory (SM) 88 and a cache memory (CM) 90.

Package Memories 70 are configured of, for example, volatile memory as a main memory, and in each Package Memory 70, cache control information among the information stored in the shared memory 88 is stored as unique information for each of the microprocessors 80, 82, 84 and 86. In local memories 72, 74, 76 and 78, the information to be processed by the microprocessors 80, 82, 84 and 86 respectively is stored.

For storing various types of information in the Package Memories (PM) 70 of the Microprocessor Packages 46, 48, 50 and 52, this embodiment assumes that cache control information is stored in the shared memory 88, and that the cache control information stored in the shared memory 88 is stored separately in the Package Memories 70.

Figure 2:
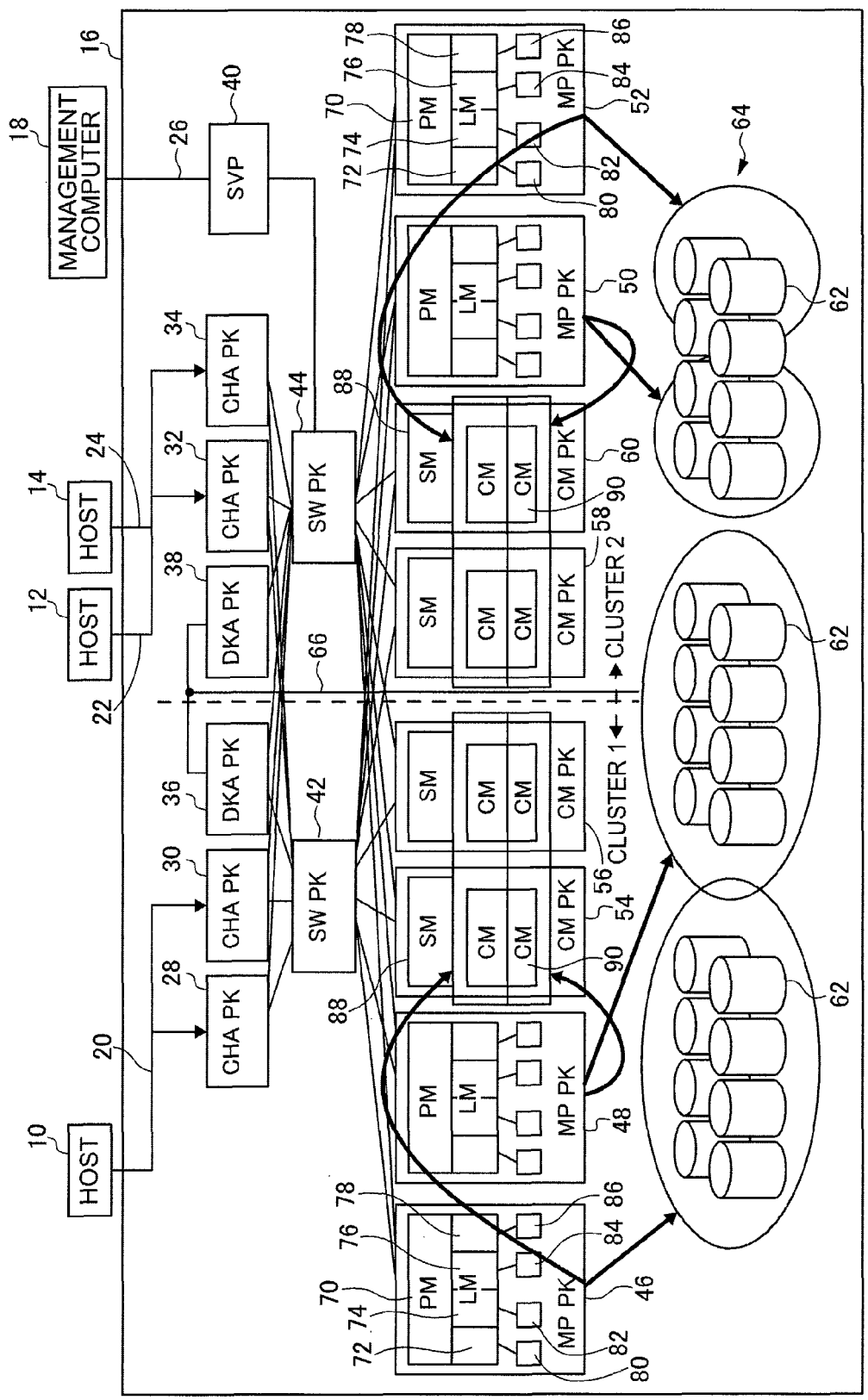
FIG. 2 is a conceptual diagram showing the methods of allocating the VDEV ownership and the cache segment ownership.

Furthermore, for storing control information such as cache control information in each Package Memory (PM) 70, as shown by the arrows in FIG. 2, the ownerships for accessible virtual devices (VDEVs) and for cache segments (an element of a cache area in a cache memory 90 divided into segments) are allocated to all the Microprocessor Packages, and each Microprocessor Package manages the ownerships for virtual devices (VDEVs) or for cache segments (cache areas). In this case, the ownership indicates the occupation of the access right to virtual devices (VDEVs) or to cache segments and the exclusion of the other accesses.

By each Microprocessor Package separately managing the ownerships for virtual devices (VDEVs) and cache segments, the Microprocessor Packages owning the ownerships among the Microprocessor Packages 46, 48, 50, and 52 can access the cache memory 70 or the HDDs 62 with reference to the cache control information stored in the Package Memories (PM) 70 without accessing the shared memory 88.

For managing the VDEV ownership related to virtual devices (VDEVs) configured of HDDs 62, each shared memory 88, as shown in FIG. 3 (*a*), stores a VDEV ownership management table T1 as the table for managing the ownership related to all virtual devices (VDEVs), and each Package Memory 70, as shown in FIG. 3 (*b*), stores a VDEV ownership management table T2 as the table for managing the ownership related to virtual devices (VDEVs) per Microprocessor Package or MPPK.

The VDEV ownership management table T1 is configured of the VDEV number field 101 and the MPPK number field 102. Each entry of the VDEV number field 101 stores a virtual device (VDEV) number, and each entry of the MPPK number field 102 stores an MPPK number when the Microprocessor Packages 46 to 52 are divided into MPPKs #0 to #n.

The VDEV ownership management table T2 is configured of the VDEV number field 103 and the MPPK number field 104. Each entry of the VDEV number field 103 stores a virtual device (VDEV) number, and each entry of the MPPK number field 104 stores the number of an MPPK to which each Package Memory (PM) 70 belongs when the Microprocessor Packages 46 to 52 are divided into MPPKs #0 to #n.

Next, for managing the cache segment ownership for the ownership to access a cache memory 90 by each Microprocessor Package or MPPK, a shared memory 88, as shown in FIG. 4 (*a*), stores a cache segment ownership management table T3 as the table for managing the ownership related to all cache segments, and each Package Memory 70, as shown in FIG. 4 (*b*), stores a cache segment ownership management table T4 as the table for cases where that MPPK owns the ownership.

The cache segment ownership management table T3 is configured of the CMPK number—cache segment group number field 105 and the MPPK number field 106. Each entry of the CMPK number—cache segment group number field 105 stores the CMPK number and the cache segment group number when the Cache Memory Packages 54 to 60 to each of which the cache memory 90 belongs are divided into CMPKs #0 to #n. Each entry of MPPK number field 106 stores an MPPK number when the Microprocessor Packages 46 to 52 are divided into MPPKs #0 to #n. In this case, the cache segment group indicates a group created when the capacity of a cache memory 90 is divided, for example, into multiple groups as 128 megabytes of cache segments.

The cache segment ownership management table T4 is configured of the management number field 107 and the CMPK number—cache segment group number field 108. Each entry of the management number field 107 stores a number for managing each Package Memory 70. Each entry of the CMPK number—cache segment group number field 108 stores the CMPK number and the cache segment group number to which the cache memory 90 belongs.

For allocating the VDEV ownership and the cache segment ownership, the setting can be changed automatically at the initial setting of the device boot according to the load of each of the microprocessors 80 to 86, or can be changed by the user.

Furthermore, the setting of the tables can also be changed, triggered by the occurrence of abnormality including an MPPK failure. In this case, as for the allocation of the ownerships, it is preferable to allocate the operation rate of the microprocessors 80 to 86 and the usage rate of cache memory 90 as equally as possible among MPPKs. Furthermore, for automatically changing the setting with reference to the load, it is preferable to periodically monitor the load status of the microprocessors 80 to 86 or to monitor the usage rate of the cache memory 90.

Figure 5:
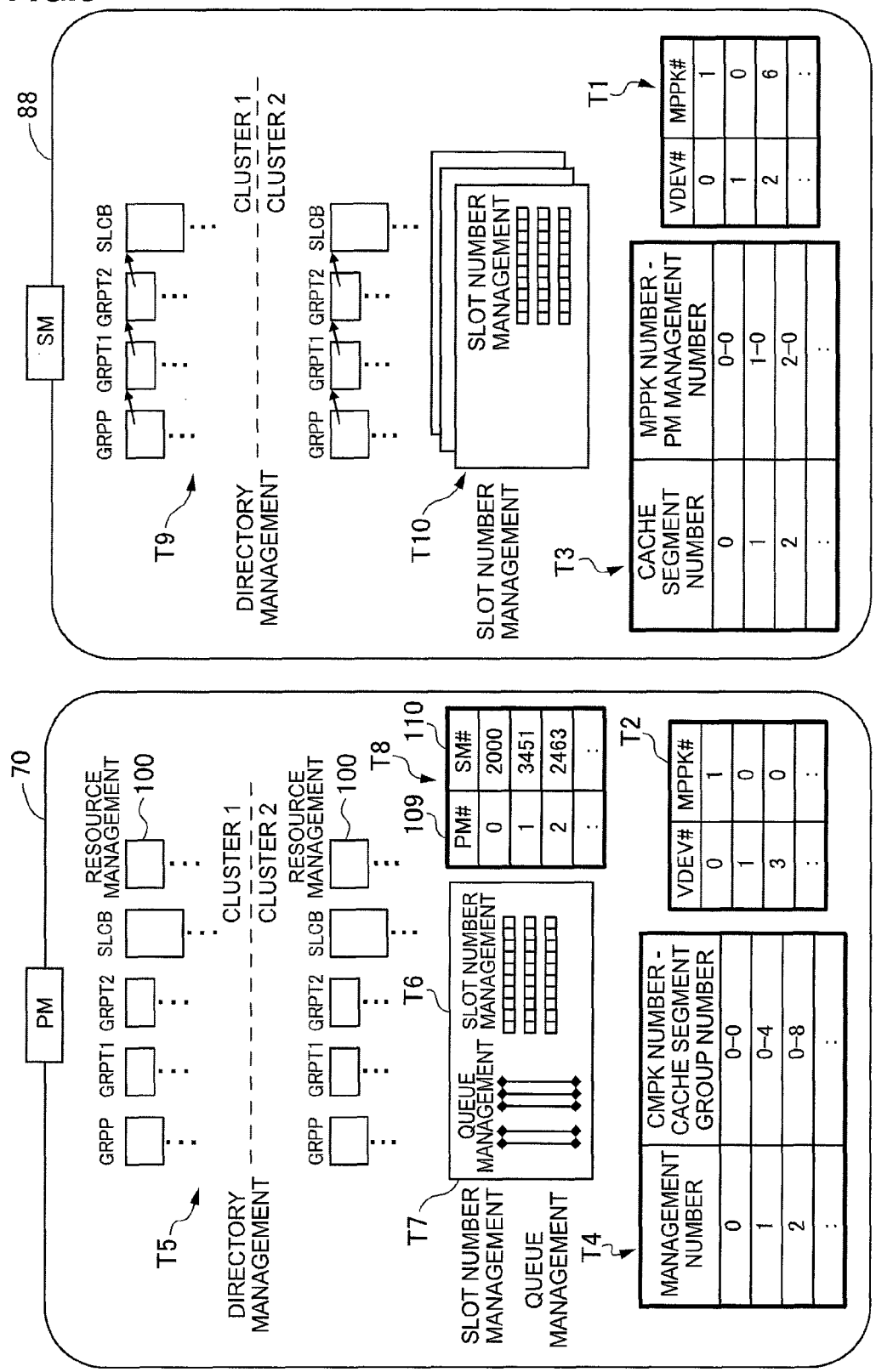
FIG. 5 is a configuration diagram showing the configuration of PM/SM cache management tables.

Next, the configuration of the tables stored in each Package Memory 70 and shared memory 88 are shown in FIG. 5. A Package Memory (PM) 70 stores, as well as the VDEV ownership management table T2 and the cache segment ownership management table T4, a directory management table T5, a slot number management table T6, a queue management table T7 and a variable segment mapping table T8 while a shared memory 88 stores, as well as the VDEV ownership management table T1 and the cache segment ownership management table T3, a directory management table T9 with the same contents as the directory management table T5 and as many slot number management tables T10 as the number of the MPPKs.

The directory management tables T5 and T9 are the tables for searching the cache segment in use and managing the cache segment information, and each of them is configured of reference tables GRPP, GRPT1, GRPT2, a slot control block SLOB as a management table, and resource management information 100.

The reference tables GRPP, GRPT1 and GRPT2 are the tables to be referred to when searching cache segments and they configure a directory structure with the reference table GRPP at the top and the reference table GRPT2 at the bottom. The slot control block SLOB is the table for managing cache segment related information and stores information including whether data exists in the cache memory 90.

The resource management information 100 stores the information for performing exclusion when multiple jobs refer to and upgrade a cache segment at a time. For example, if a microprocessor has the ownership for a cache segment, the information for excluding the accesses by the other microprocessors to this cache segment is stored.

The directory management tables T5 and T9 have the same configuration, in which the pointers of the shared memory 88 can be used as pointers among all the tables. Furthermore, searching the directory by using the information in the Package Memory (PM) 70 is made possible by referring to the pointers in the directory management table T9, also referring to the variable segment mapping table T8, and changing the pointer to the corresponding PM pointer.

The queue management table T7 is the table for managing the slot attributes according to the queue structure by considering the cache segments of the cache memory 90 as slots and classifying the slot attributes into free, clean, dirty, etc. The slot number management table T6 is the table for managing the slot attributes and the number of slots.

In this case, among the slot attributes, free indicates that the status data does not exist in the cache memory 90 or in the HDDs 62, clean indicates that the status data exists in the cache memory 90 and in the HDDs 62, and dirty indicates that data exists only in the cache memory 90 but does not exist in the HDDs 62.

By using the slot number management table T6 and the queue management table T7, load control and destaging processing can be performed for the cache memory 90. Furthermore, for the Package Memory (PM) 70 to be able to independently perform I/O processing, the number of slots and the queue are managed by using the Package Memory 70, and the shared memory 88 reflects the information of the slot number management table T6 on the slot number management table T10 for a backup.

That is, by configuring the slot number management table T10 with the minimum elements required for the backup and by storing the queue management table T7 and the resource management information 100 only in the Package Memory (PM) 70 instead of storing them in the shared memory 88, the processing performance is improved.

Furthermore, the reason the queue management table T7 is not required in the shared memory 88 is that the information of the queue management table T7 can be restored by the information of the slot control block SLOB and the number of slots. Furthermore, the resource management information 100 needs to be restored when the resource management information 100 stored in the Package Memory 70 is lost. In that case, the VDEV ownership managed by the MPPK to which the Package Memory (PM) 70 belongs is transferred to another MPPK, and the MPPK to which the right is transferred is in the status that a slot can be used newly from 1 and the old exclusion information is not required.

The variable segment mapping table T8 is configured of the PM number field 109 and the SM number field 110. Each entry of the PM number field 109 stores a number of the Package Memory (PM) 70 and each entry of the SM number field 110 stores a number of the shared memory (SM) 88. That is, the variable segment mapping table T8 stores the Package Memories (PM) 70 and shared memories (SM) 88 by making their positions correspond.

Note that, though control information stored in each Package Memory (PM) 70 is usually updated synchronously with I/O processing, all the tables stored in the shared memory (SM) 88 are updated synchronously with the update of the tables stored in the Package Memory (PM) 70. In this case, as the slot number management table T10 can allow a certain margin of error, it can be updated either synchronously or asynchronously when updating the slot number management table T6 of the Package Memory (PM) 70.

Figure 6:
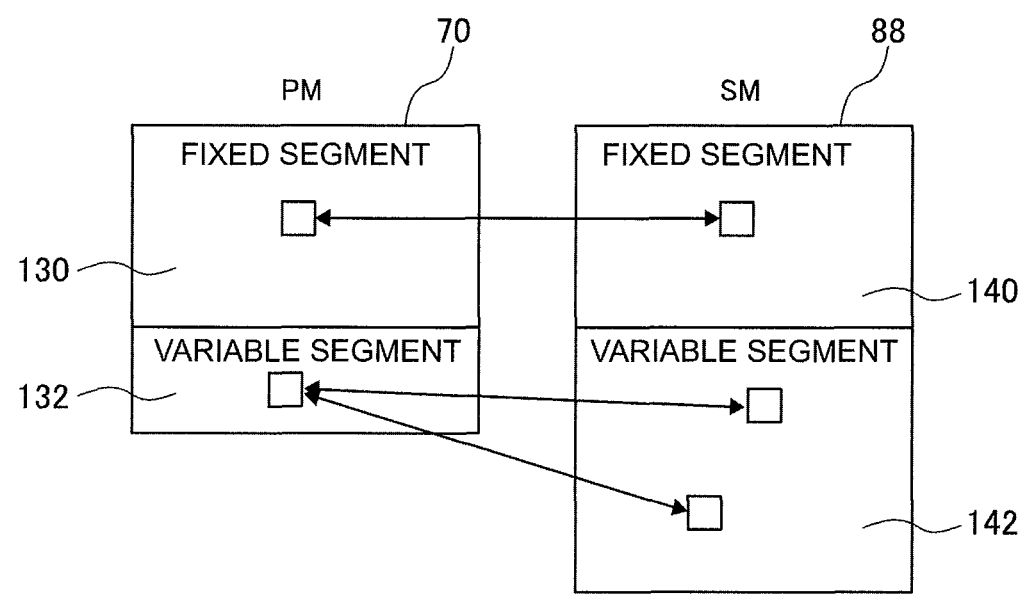
FIG. 6 is a configuration diagram showing fixed and variable segments set in a shared memory and a package memory.

Furthermore, in a Package Memory (PM) 70, as shown in FIG. 6, the storage area is divided into a fixed segment (first fixed segment) 130 and a variable segment (first variable segment) 132 while the storage area of a shared memory 88 is divided into a fixed segment (second fixed segment) 140 and a variable segment (second variable segment) 142. In the fixed segments 130 and 140, cache memory control information is stored respectively by a 1 to 1 relationship and at the same time, the table information such as the information of the directory management tables T5 and T9 are stored. In this case, the same cache memory information is stored both in the fixed segment 130 and in the fixed segment 140.

Meanwhile, in the variable segments 132 and 142, the information which is changed due to the transfer of the ownerships, such as the variable segment mapping table T8, is stored. Furthermore, it is also possible to divide the fixed segments 130 and 140 and the variable segments 132 and 142 at a specific ratio, e.g., 3 to 1 in advance or at a rate arbitrarily specified by the user.

The behavior of a storage subsystem is described below, with reference to the attached drawings. Note that, among the Microprocessor Packages 46 to 52, the Microprocessor Package which owns the VDEV ownership (first ownership) or the cache segment ownership (second ownership) is hereinafter referred to as an MPPK (Microprocessor Package), and among the MPPKs 80 to 86 which own the VDEV ownership or the cache segment ownership, the Microprocessor to perform the processing is hereinafter referred to as a Microprocessor MP.

Figure 7:
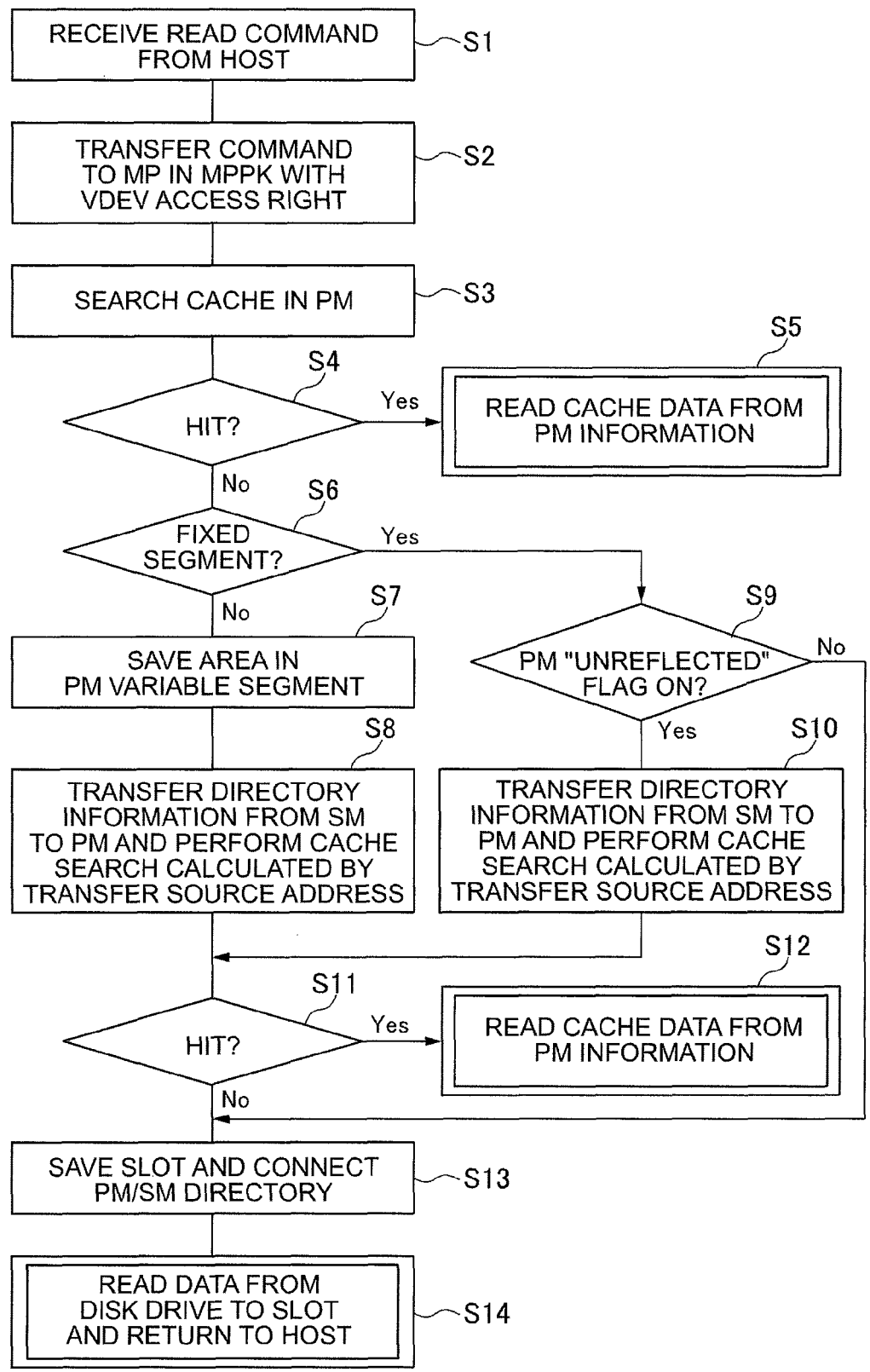
FIG. 7 is a flowchart showing the read processing accompanying I/O cache search.

Firstly, the I/O cache search processing is described with reference to the flowchart in FIG. 7. For performing the read processing due to the I/O cache search, for example, if the Channel Adapter Package 28 of the storage subsystem 16 receives a read command from the host computer 10, the read processing is started (S1), and the Channel Adapter Package 28 refers to the VDEV ownership management table T1 and transfers the command to the Microprocessor MP of the MPPK which owns the VDEV ownership (S2). In this case, the Channel Adapter Package 28, for example, transfers the command to the Microprocessor MP of the MPPK 1.

The Microprocessor MP which has received the command searches the directory management table T5 among the cache control information in the Package Memory (PM) 70 (S3) and determines whether there is a hit (S4). That is, the Microprocessor MP searches the directory management table T5, determines whether any data exists in the slot control block SLOB, and if it does, performs the processing of reading data from the cache memory 90 with reference to the cache control information in the Package Memory (PM) 70 (S5).

Meanwhile, if it is determined at step S4 that there is no hit, the Microprocessor MP determines whether it is a fixed segment 130 for searching the information of the shared memory (SM) 88 (S6), and if it is determined that it is not a fixed segment 130, saves an area for a variable segment 132 (S7), transfers the information of the directory management table T5 from the shared memory (SM) 88 to the Package Memory (PM) 70, and performs a cache search (S8). In this case, the transfer source address is calculated according to the variable segment mapping table T8.

Meanwhile, if it is determined at step S6 that it is a fixed segment 130, the Microprocessor MP determines whether the PM "Unreflected" flag is on (S9). That is, the Microprocessor MP determines whether the cache control information of the shared memory (SM) 88 is reflected on the Package Memory (PM) 70, and if it is not, i.e., the PM "Unreflected" flag is on, transfers the information of the directory management table T9 from the shared memory (SM) 88 to the Package Memory (PM) 70, and performs a cache search with reference to the transferred information (S10). In this case, the transfer source address is calculated with reference to the cache segment ownership management table T4.

Furthermore, if it is determined at step S9 that the PM "Unreflected" flag is not on, i.e., the "Unreflected" flag is off and if there is no data in the fixed segment 140 either, the Microprocessor MP considers it as a cache miss and proceeds to the next processing.

Next, after the step S8 or the step S10, the Microprocessor MP performs a cache search with reference to the transferred data, determines whether there is a hit (S11), and if there is, performs the processing of reading data from the cache memory 90 with reference to the cache control information transferred to the Package Memory (PM) 70 (S12).

Meanwhile, if it is determined at step S11 that there is no hit, the Microprocessor MP saves a new slot in the cache memory 90, performs the processing for the connection of the shared memory (SM) 88 with the Package Memory (PM) 70 (S13), reads data from the HDDs 62 to a new slot, performs the processing of returning the read data to the host computer 10 (S14), and completes the processing of this routine.

Figure 8:
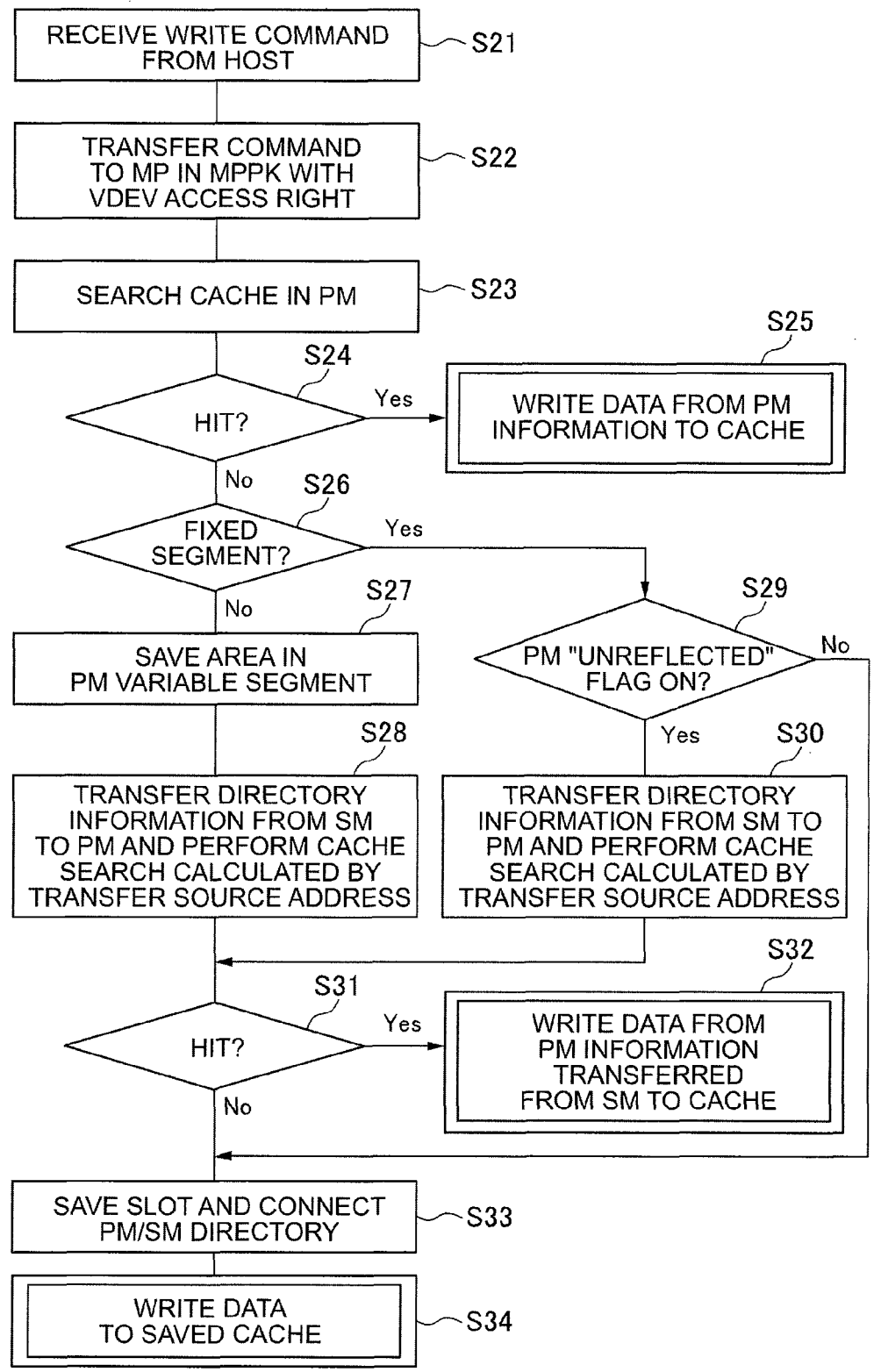
FIG. 8 is a flowchart showing the write processing accompanying I/O cache search.

Next, a write processing due to the I/O cache search is described with reference to the flowchart in FIG. 8. Firstly, if the Channel Adapter Package 28 of the storage subsystem 16 receives a write command from the host computer 10, the write processing is started (S21), and the Channel Adapter Package 28 refers to the VDEV ownership management table T1 and transfers the command to the Microprocessor MP of the MPPK which owns the VDEV ownership (S22). In this case, the Channel Adapter Package 28, for example, transfers the command to the Microprocessor MP of the MPPK #1.

The Microprocessor MP which has received the command searches the directory management table T5 among the cache control information in the Package Memory (PM) 70 (S23) and determines whether there is a hit (S24). That is, the Microprocessor MP searches the directory management table T5, determines whether any data exists in the slot control block SLOB, and if it does, performs the processing of writing data to the cache memory 90 with reference to the cache control information in the Package Memory (PM) 70 (S25).

Meanwhile, if it is determined at step S24 that there is no hit, the Microprocessor MP determines whether it is a fixed segment 130 for searching the information of the shared memory (SM) 88 (S26), and if it is determined that it is not a fixed segment 130, saves an area for a variable segment 132 (S27), transfers the information of the directory management table T5 from the shared memory (SM) 88 to the Package Memory (PM) 74, and performs a cache search (S28). In this case, the transfer source address is calculated with reference to the variable segment mapping table T8.

Meanwhile, if it is determined at step S26 that it is a fixed segment 130, the Microprocessor MP determines whether the PM "Unreflected" flag is on (S29). That is, the Microprocessor MP determines whether the cache control information of the shared memory (SM) 88 is reflected on the Package Memory (PM) 70, and if it is not, i.e., the PM "Unreflected" flag is on, transfers the information of the directory management table T9 from the shared memory (SM) 88 to the Package Memory (PM) 70, and performs a cache search with reference to the transferred information (S30). In this case, the transfer source address is calculated with reference to the cache segment ownership management table T4.

Furthermore, if it is determined at step S29 that the PM "Unreflected" flag is not on, i.e., the "Unreflected" flag is off and if there is no data in the fixed segment 140 either, the Microprocessor MP considers it as a cache miss and proceeds to the next processing.

Next, after the step S28 or the step S30, the Microprocessor MP performs a cache search with reference to the transferred data, determines whether there is a hit (S31), and if there is, performs the processing of writing data to the cache memory 90 with reference to the information transferred to the Package Memory (PM) 70 (S32).

Meanwhile, if it is determined at step S31 that there is no hit, the Microprocessor MP saves a new slot in the cache memory 90, performs the processing for the connection of the shared memory (SM) 88 with the Package Memory (PM) 70 (S33), writes data from the HDDs 62 to a new slot, performs the processing of returning the written data to the host computer 10 (S34), and completes the processing of this routine.

Figure 9:
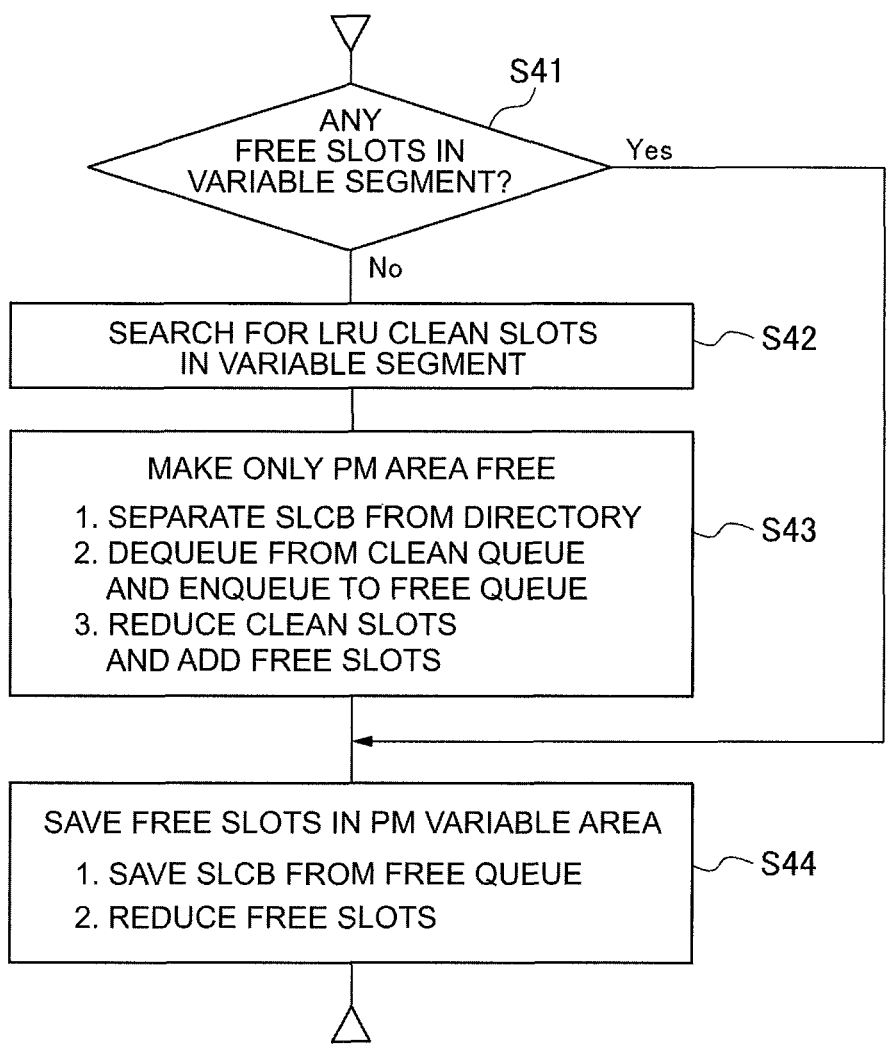
FIG. 9 is a flowchart showing the processing of saving a PM variable segment.

Next, the PM variable segment saving processing is described with reference to the flowchart in FIG. 9. This processing is performed as step S7 in FIG. 7 and step S27 in FIG. 8. Firstly, the Microprocessor MP refers to the slot number management table T6, determines whether there are any free slots in the variable segment 132 (S41), and if there are no free slots, refers to the queue management table T7 and performs a search for the LRU (Least Recently Used) clean slot in the variable segment (S42). That is, the processing of searching for the least recently used clean slot among the clean slots exist in the variable segment 132 is performed.

Next, as the processing of making only the area of the Package Memory (PM) 70 free, the Microprocessor MP separates the slot control block SLOB from the directory management table T5, dequeues the clean slots in the queue management table T7, and enqueues them into free queues. Furthermore, as the clean slots are enqueued into the free slots, the Microprocessor MP reduces the clean slots in the slot number management table T6 and adds the free slots (S43).

Subsequently, the Microprocessor MP saves the newly enqueued free slots in the slot control block SLOB, updates the information in the directory management table T5 and the queue management table T7, further reduces the number of the free slots for updating the slot number management table T6 (S44), and completes the processing of this routine.

Figure 10:
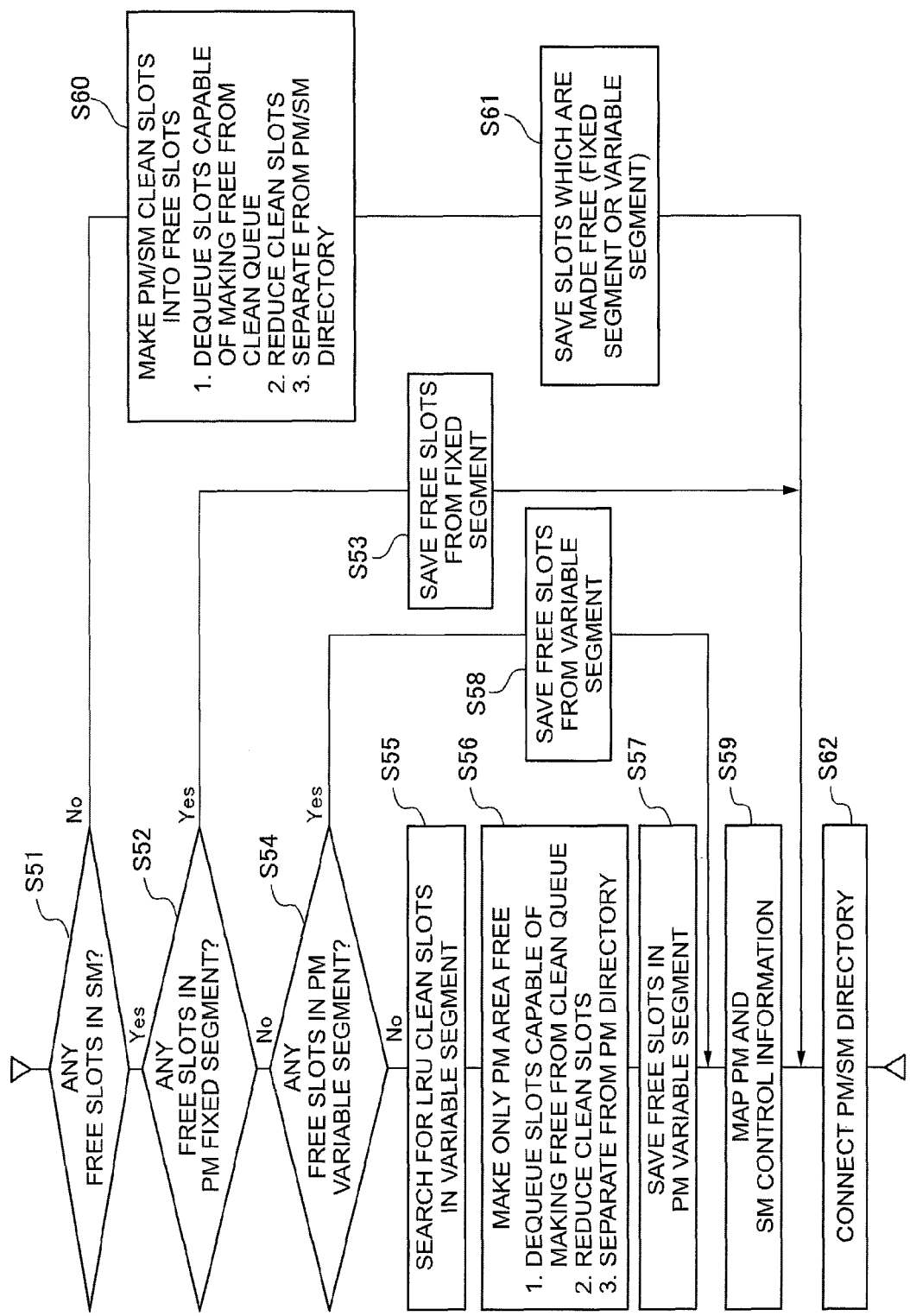
FIG. 10 is a flowchart showing the processing of saving a slot.

Next, the slot saving processing is described with reference to the flowchart in FIG. 10. This processing is performed as step S13 in FIG. 7 and step S33 in FIG. 8. Firstly, the Microprocessor MP refers to the slot number management table T6, determines whether there are any free slots in the variable segment 142 of the shared memory (SM) 88 (S51). If there are, for making only the area of the Package Memory (PM) 70 free, the Microprocessor MP determines whether there are any free slots in the fixed segment 130 of the Package Memory (PM) 70 (S52), and if there are free slots, refers to the slot number management table T6 and the queue management table T7 and performs the processing of saving free slots from the fixed segment 130 (S53), or if there are no free slots, determines whether if there are any free slots in the variable segment 132 of the Package Memory (PM) 70 (S54).

If it is determined at step S54 that there is no free slot in the 132, the Microprocessor MP performs a variable segment LRU clean slot search (S55). Subsequently, the Microprocessor MP refers to the queue management table T7, dequeues the slots which can be made free from the clean queues, reduces the clean slots due to making the clean queues into free slots, updates the slot number management table T6, separates the free queues from the directory management table T5 (S56), and then saves the area for free slots in the variable segment 132 (S57).

If it is determined at step S54 that free slots exist in the 132, the Microprocessor MP performs refers to the slot number management table T6 and the queue management table T7 and saves free slots in the variable segment 132 (S58).

After the step S57 or the step S58, the Microprocessor MP maps cache control information of the shared memory (SM) 88 and the Package Memory (PM) 70 and updates the variable segment mapping table T8 (S59).

Meanwhile, if it is determined at step S51 that there is no free slot in the shared memory (SM) 88, the Microprocessor MP performs the processing of enqueueing clean slots into free slots for the Package Memory (PM) 70 and the shared memory (SM) 88 (S60).

That is, if the cache segment (slot) attribute is clean, data exists both in the cache memory 90 and in the HDDs 62, and data can be ensured even if the data of the cache memory 90 is temporarily made empty, and therefore the processing of enqueueing clean slots into free slots is performed.

As more specifically described, the Microprocessor MP refers to the queue management table T7, dequeues the slots which can be made free from the clean queues, reduces the clean slots by using the slot number management table T6, updates the slot number management table T6, and separates the clean slot information from the directory management tables T5 and T9 (S60). Subsequently, the Microprocessor MP performs the processing of saving the newly enqueued free slots in the fixed segments 130 and 140 or the variable segments 132 and 142 (S61).

Next, the Microprocessor MP performs the processing of matching the directory management table T5 and the directory management table T9 (S62), and completes the processing of this routine.

Figure 11:
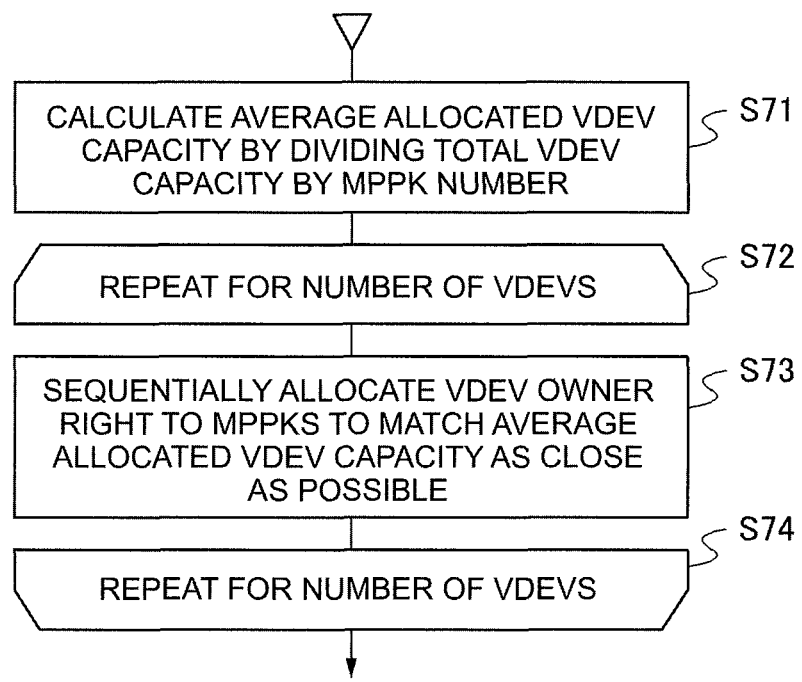
FIG. 11 is a flowchart showing the processing of creating a VDEV ownership table.

Next, the VDEV ownership table creation processing is described with reference to the flowchart in FIG. 11. This processing is started by a Microprocessor MP in any of the MPPKs at the initial start, for example, when the system is powered on. At this time, the processing of allocating the VDEV capacity equally to all the MPPKs is performed.

As more specifically described, the Microprocessor MP divides the total VDEV capacity by the number of MPPKs to calculate the average allocated VDEV capacity (S71), and repeats this processing for the number of VDEVs (S72). Next, the Microprocessor MP sequentially allocates the VDEV ownership to the MPPKs to match the average allocated VDEV capacity as close as possible (S73). The Microprocessor MP also repeats this processing for the number of VDEVs (S74). For example, in a case of 100 VDEVs and 4 MPPKs, the processing of allocating 25 VDEVs to each MPPK is performed, and the processing of allocating the VDEV ownership for the 100 VDEVs to each MPPK is repeated 100 times.

Figure 12:
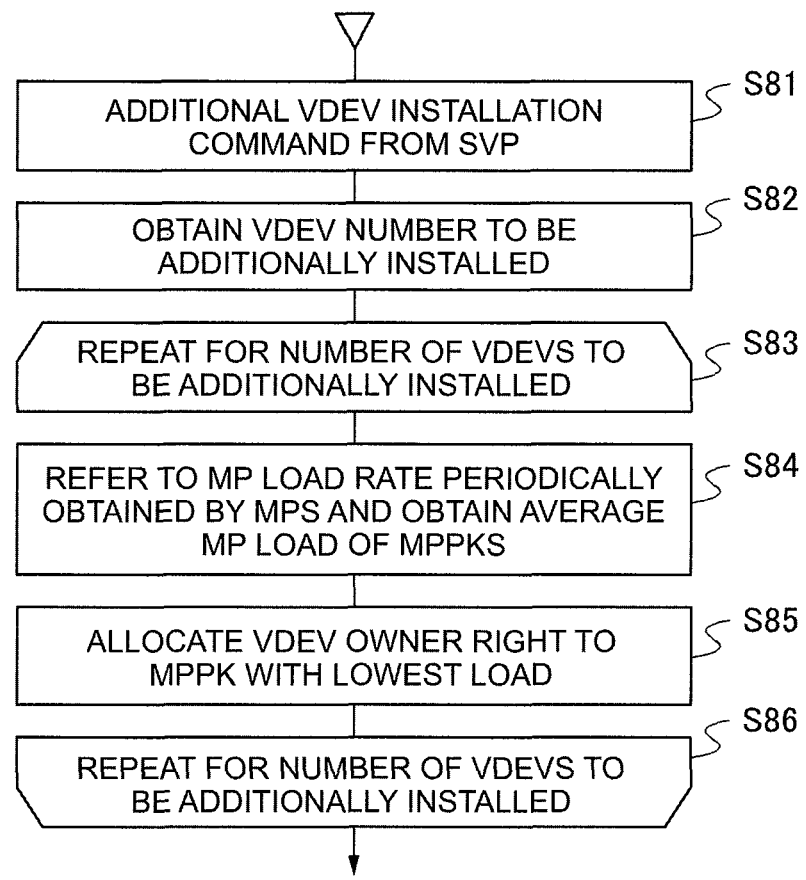
FIG. 12 is a flowchart showing the processing of updating a VDEV ownership table when installing additional VDEVs.

Next, a VDEV ownership table updating processing when installing additional VDEVs is described with reference to the flowchart in FIG. 12. This processing is performed by the Microprocessor MP with the lowest load. Firstly, the Microprocessor MP starts the processing under the condition that it has received a command for installing additional VDEVs from the Service Processor 40 (S81), obtains the VDEV number to be additionally installed with reference to the command from the Service Processor 40 (S82), and repeats the processing for obtaining the numbers for the number of VDEVs to be additionally installed (S83). Subsequently, the Microprocessor MP with low load refers to a MP load rate periodically obtained by the other Microprocessors MPs, obtains the average MP load of the MPPKs (S84), refers to the VDEV ownership management table T1, allocates the VDEV ownership to the MPPK with the lowest load (S85), repeats the above-mentioned processing for the number of VDEVs to be additionally installed (S86) and completes the processing of this routine.

Figure 13:
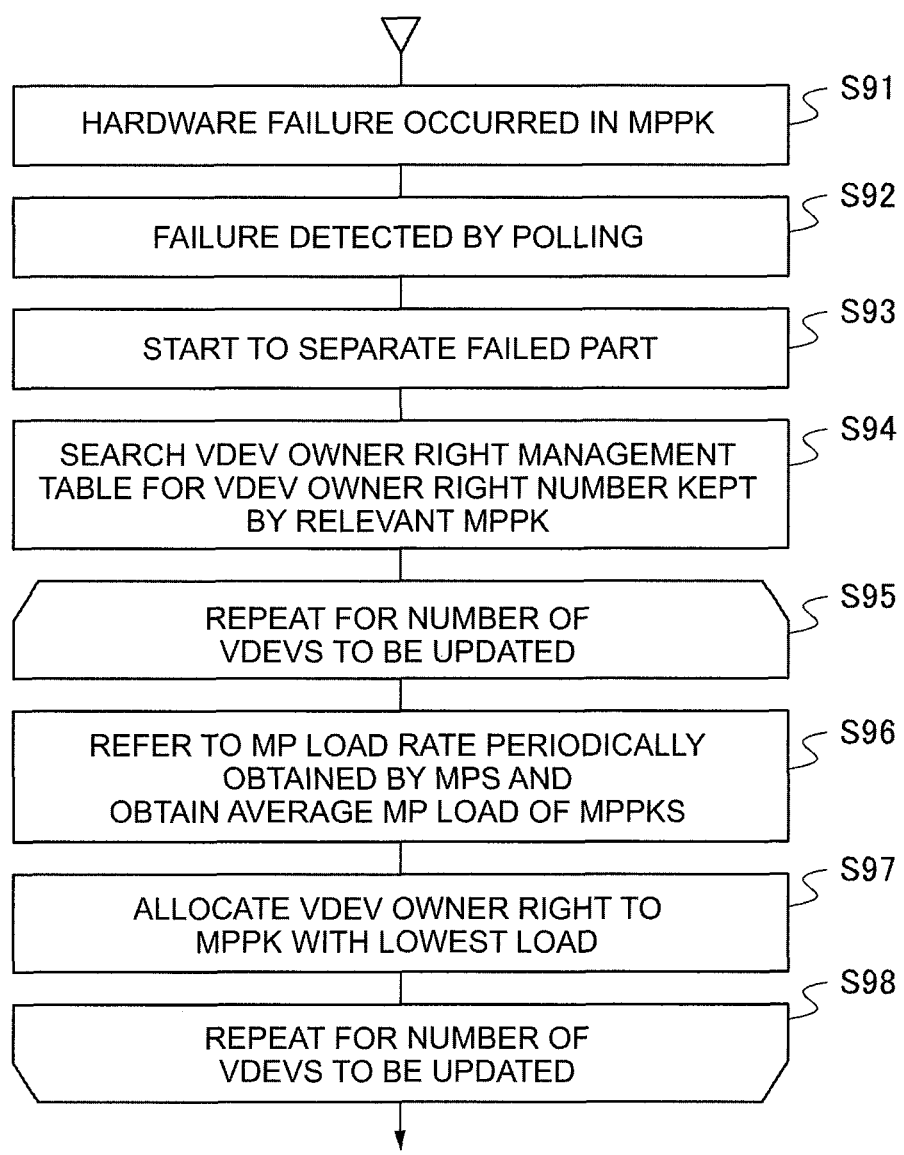
FIG. 13 is a flowchart showing the processing of updating a VDEV ownership table at the time of an MPPK failure.

Next, a VDEV ownership management table updating processing at the time of an MPPK failure is described with reference to the flowchart in FIG. 13. This processing is performed by the Microprocessor MP with low load among the normal Microprocessors MPs. Firstly, this processing is started under the condition that a hardware failure has occurred in any of the MPPKs (S91). Subsequently, the normal Microprocessor MP takes in the information from the other Microprocessors MPs by polling, detects the failure (S92) and starts the processing of separating the failed part (S93).

Subsequently, the normal Microprocessor MP searches the VDEV ownership management table T1 for the VDEV ownership number kept by the MPPK where the failure has occurred (S94) and repeats the processing for the number of VDEVs to be updated (S95). Subsequently, the Microprocessor MP with the lowest load among the normal Microprocessors MPs refers to the MP load rate periodically obtained by the other Microprocessors MPs, obtains the average MP load of the MPPKs (S96), refers to the VDEV ownership management table T1, allocates the VDEV ownership to the MPPK with the lowest load (S97), repeats the above-mentioned processing for the number of VDEVs to be updated (S98) and completes the processing of this routine.

Figure 14:
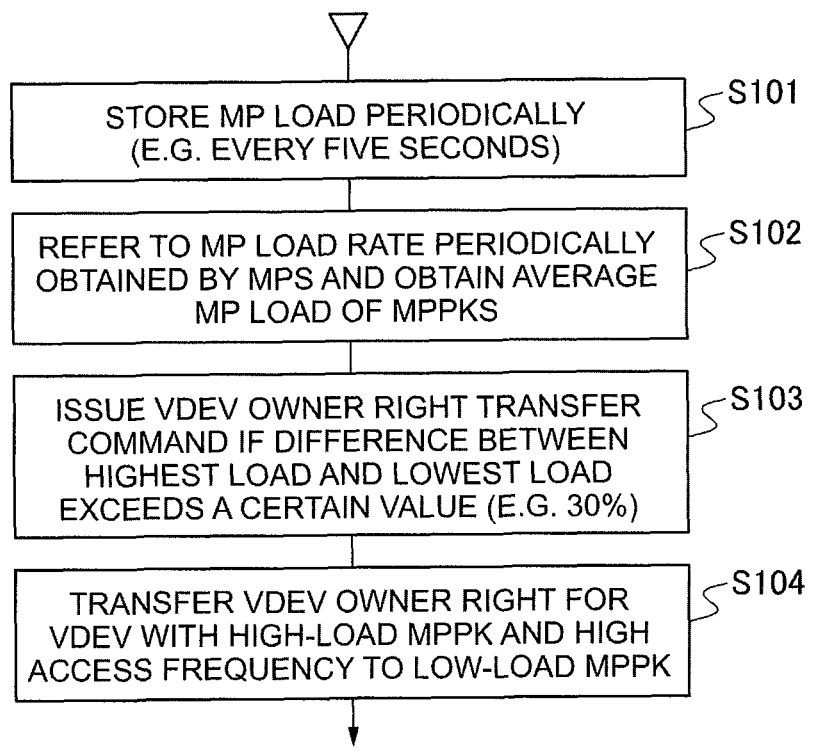
FIG. 14 is a flowchart showing the processing of updating a VDEV ownership table when adjusting MP load.

Next, the VDEV ownership management table updating processing when adjusting MP load is described with reference to the flowchart in FIG. 14. This processing is performed by the Microprocessor MP with the lowest load. The Microprocessor MP with the lowest load stores the MP load periodically, for example, every five seconds (S101), refers to the MP load rate obtained by the Microprocessors MPs, obtains the average MP load of the MPPKs (S102), issues a command for transferring the VDEV ownership under the condition that the difference between the highest load and the lowest load exceeds 30%, for example, that is, the difference between the load of one MPPK and the load of the other MPPK exceeds, for example, 30% (S103), refers to the VDEV ownership management table T1, transfers the VDEV ownership for the VDEV with the high-load MPPK and high access frequency to the low-load MPPK (S104), and completes the processing of this routine.

Figure 15:
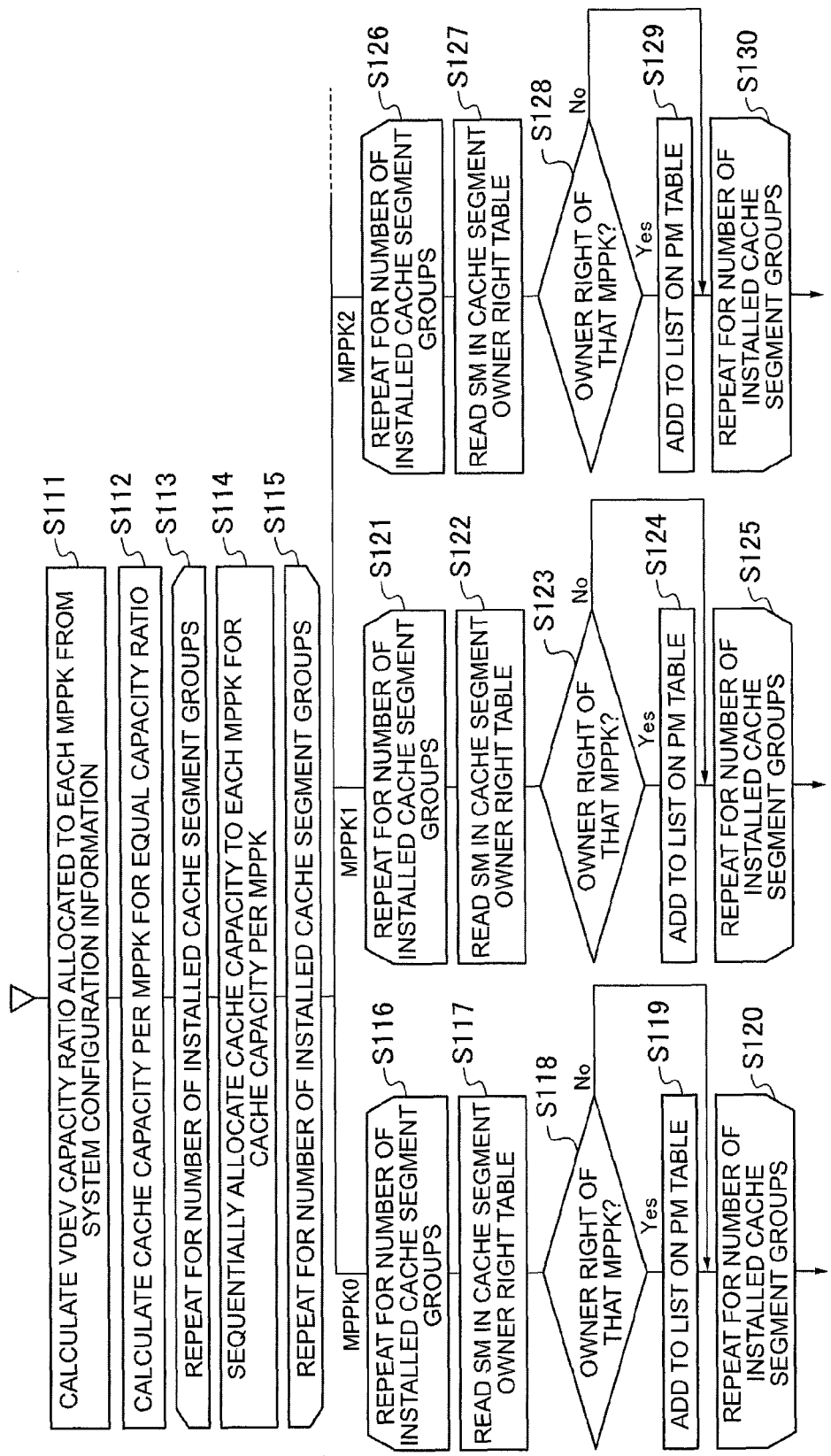
FIG. 15 is a flowchart showing the processing of creating a cache segment ownership management table.

Next, the cache segment ownership management table creation processing is described with reference to the flowchart in FIG. 15. This processing is performed by one Microprocessor MP in the device. Firstly, the Microprocessor MP refers to the VDEV ownership management table T1, calculates the VDEV capacity ratio allocated to each of the MPPKs with reference to the system configuration information (S111), calculates the cache capacity per MPPK to be an equal capacity ratio (S112), and repeats the above-mentioned processing for the number of installed cache segment (SEG) groups (S113). Subsequently, the Microprocessor MP refers to the cache segment ownership management table T3, sequentially allocates the cache capacity to each of the MPPKs to be the cache capacity per MPPK (S114), and repeats the above-mentioned processing for the number of installed cache segment (SEG) groups (S115).

Next, the processing of transferring the information of the tables created in the shared memory (SM) of each MPPK to the Package Memory (PM) 70 is performed.

For example, the MPPK #0 starts to repeat the processing for the number of installed cache segment (SEG) groups (S116), refers to the cache segment ownership management table T3, reads its contents (S117), determines with reference to the read contents whether this cache segment ownership is the ownership of that MPPK or not (S118), and if it is determined so, adds the contents to the cache segment ownership management table T4 (S119), repeats the above-mentioned processing for the number of installed cache segment (SEG) groups (S120), and completes the processing of this routine.

Subsequently, similarly, the MPPK #1 performs the processing from S121 to S125, and the MPPK #2 performs the processing from S126 to S130. Note that these sets of processing are started at the initial boot, for example, under the condition that the system is powered on.

Figure 16:
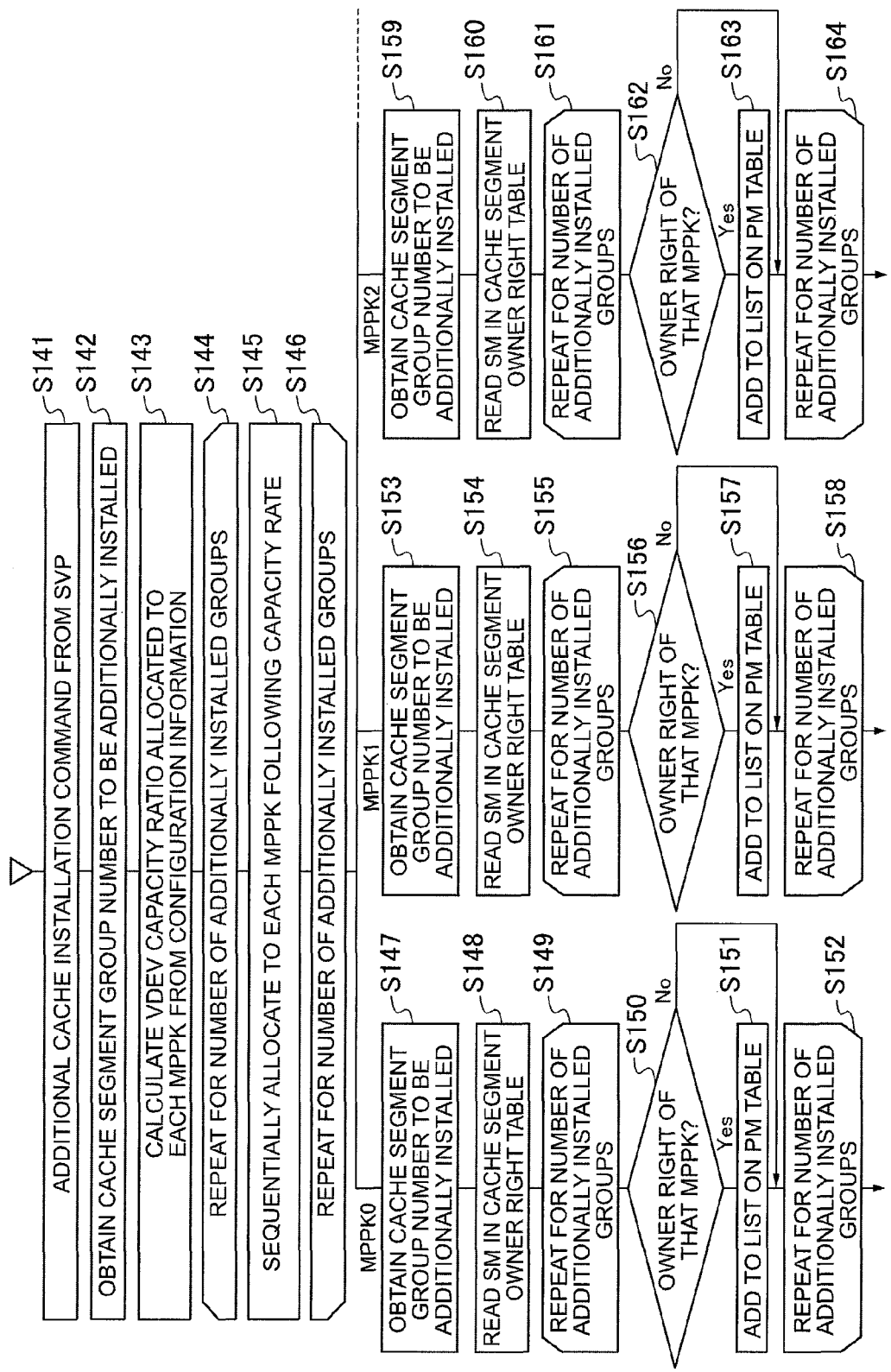
FIG. 16 is a flowchart showing the processing of updating a cache segment ownership table when installing additional cache.

Next, the cache segment ownership management table updating processing when installing additional cache is described with reference to the flowchart in FIG. 16. This processing is performed by the Microprocessor MP with the lowest load in the device. Firstly, the Microprocessor MP starts the processing under the condition that it has received an additional cache installation command from the Service Processor 40 (S141), obtains the numbers of the cache segment (SEG) groups to be additionally installed (S142), refers to the VDEV ownership management table T1, calculates the VDEV capacity rate allocated to each of the MPPKs with reference to the system configuration information (S143), and repeats the above-mentioned processing for the number of the cache segment (SEG) groups to be additionally installed (S144).

Next, the Microprocessor MP refers to the cache segment ownership management table T3, sequentially allocates additionally installed cache segments to each MPPK (S145), and repeats the above-mentioned processing for the number of additionally installed groups (S146).

After the table updating processing for the shared memory (SM) 88 due to additional cache installation is finished, the processing of transferring the information of the shared memory (SM) 88 to the Package Memory (PM) 70 per MPPK is performed. In this case, the Microprocessor MP with the lowest load in each MPPK performs the processing.

For example, the MPPK #0 obtains the numbers of cache segment (SEG) groups to be additionally installed (S147), refers to the cache segment ownership management table T3, reads the contents (S148), and repeats the above-mentioned processing for the number of additionally installed groups (S149).

Subsequently, the Microprocessor MP determines whether the cache segment ownership accompanying the additional cache installation is the cache segment ownership of that MPPK or not (S150), and if it is determined so, adds the contents to the cache segment ownership management table T4 (S151), or otherwise, without adding the contents to the cache segment ownership management table T4, repeats the processing of the steps S150 and S151 for the number of additionally installed groups (S152), and completes the processing of this routine.

Similarly, the MPPK #1 performs the processing from S153 to S158, and the MPPK #2 performs the processing from S159 to S164.

Figure 17:
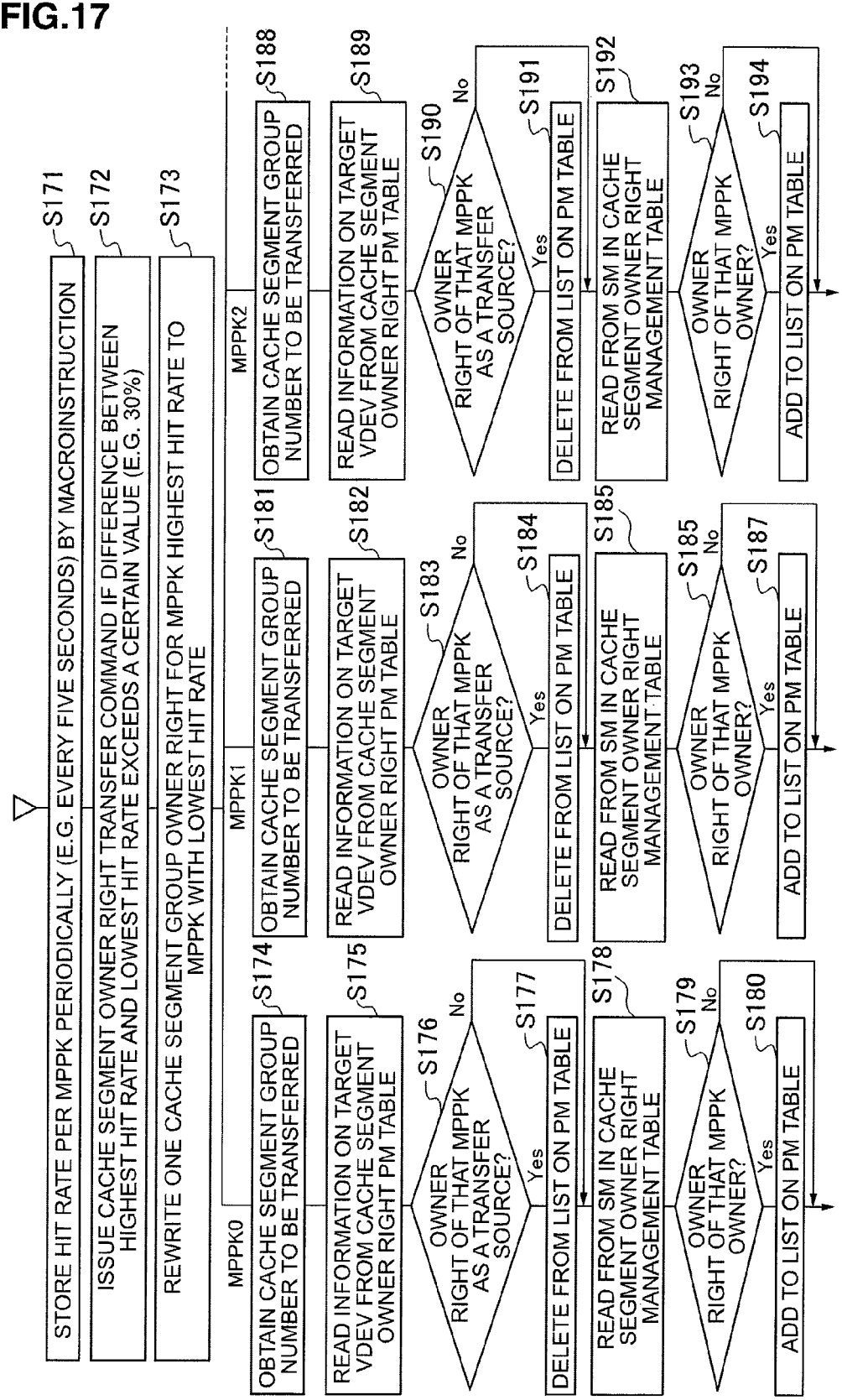
FIG. 17 is a flowchart showing the other types of processing of updating a cache segment ownership table.

Next, the other types of processing of updating the cache segment ownership management tables are described with reference to FIG. 17. This processing is performed by the Microprocessor MP with the lowest load in the device as changing processing corresponding with the cache hit rate. Furthermore, for making read access, as read access to the cache memory 90 is faster than that to the HDDs 62, the processing is performed as changing processing corresponding with the cache hit rate.

As more specifically described, the Microprocessor MP with low load stores the hit rate per MPPK periodically, for example, every five seconds (S171), and if the difference between the lowest hit rate and the highest hit rate exceeds a specific value, 30% for example, issues a command for transferring the cache segment ownership set for one MPPK to another MPPK (S172). Subsequently, the Microprocessor MP refers to the cache segment ownership management table T3, and rewrites one cache segment ownership for the MPPK with the highest hit rate to the MPPK with the lowest hit rate (S173).

After updating the cache segment ownership management table T3 stored in the shared memory (SM) 88 is completed, the processing of updating the information of the cache segment ownership management table T4 per MPPK is performed.

For example, the MPPK #0 obtains the numbers of the cache segment (SEG) groups to be transferred (S174), refers to the cache segment ownership management table T4, reads the information of the target VDEV (S175), and determines whether the cache segment ownership to be transferred is the cache segment ownership of that MPPK as a transfer source or not (S176). If it is determined to be the cache segment ownership of that MPPK as a transfer source, the Microprocessor MP deletes the original information from the cache segment ownership management table T4 (S177), or otherwise, proceeds to the step S178 as the next processing.

Next, the Microprocessor MP refers to the cache segment ownership management table T3, reads the information of the cache segment ownership to be transferred (S178), and determines whether the cache segment ownership to be transferred is the cache segment ownership of that MPPK or not (S179). If it is determined to be the cache segment ownership of that MPPK, the Microprocessor MP adds that information to the cache segment ownership management table T4 (S180), or otherwise, without adding any information to the table T4, completes the processing of this routine.

Similarly, the MPPK #1 performs the processing from S181 to S187, and the MPPK #2 performs the processing from S188 to S194.

Figure 18:
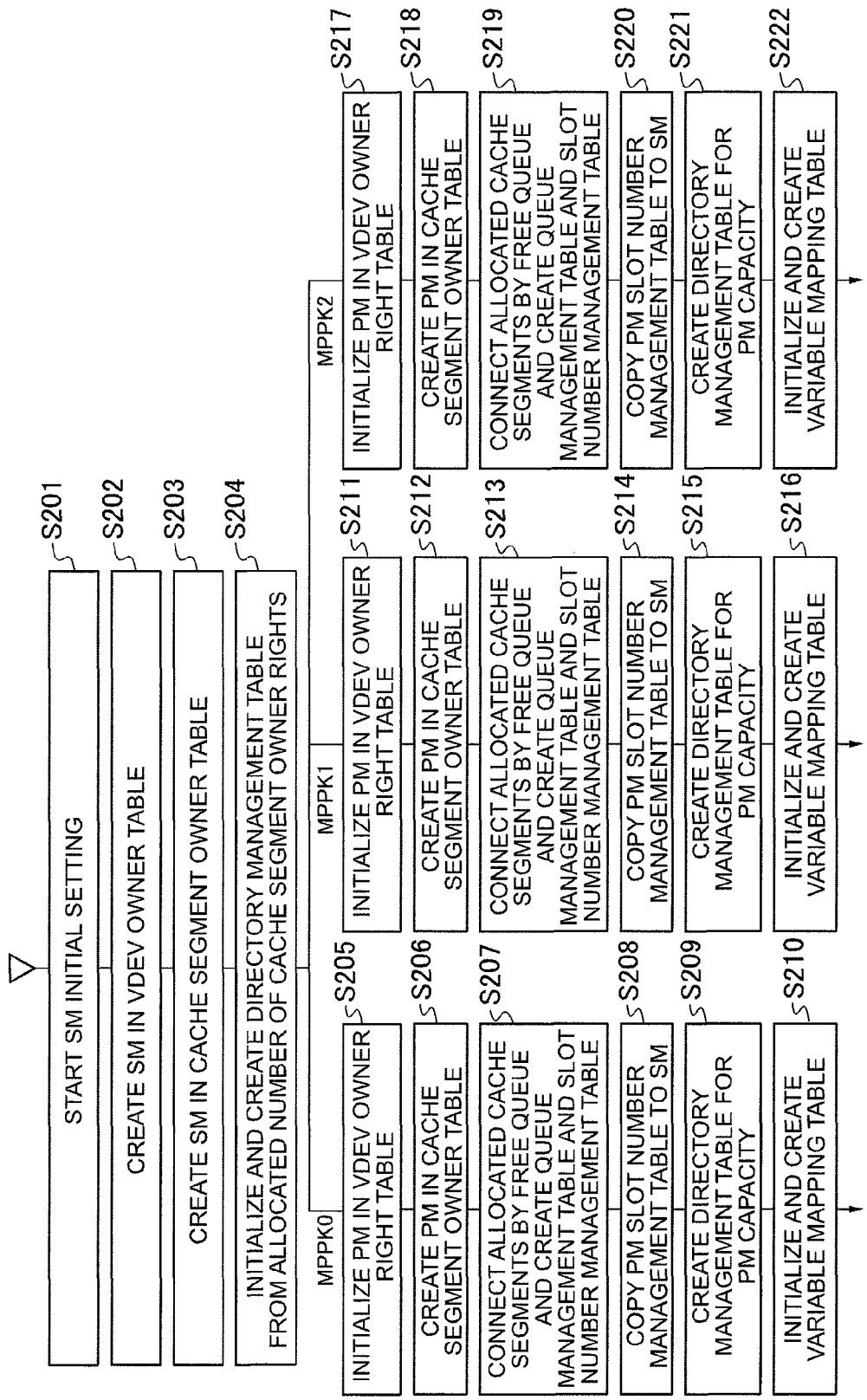
FIG. 18 is a flowchart showing the processing of creating a PM/SM cache management table.

Next, the PM/SM cache management table creation processing is described with reference to FIG. 18. This processing is performed by one Microprocessor MP in the device. Firstly, the Microprocessor MP starts the initial setting for the shared memory (SM) 88 (S201), creates a VDEV ownership management table T1 (S202), further creates a cache segment ownership management table T3 (S203), and initializes and creates a directory management table T9 with reference to the allocated number of cache segment ownerships (S204). After the information of all the tables has been created in the shared memory (SM) 88, one Microprocessor MP per MPPK creates a table for each MPPK.

For example, for the MPPK #0, the Microprocessor MP initializes the VDEV ownership management table T2 (S205), creates a cache segment ownership management table T4 (S206), connects the allocated cache SEG to free queues, creates a slot number management table T6 and a queue management table T7 (S207), and performs processing for copying the information of the slot number management table T6 to the slot number management table T10 (S208).

Next, the Microprocessor MP creates a directory management table T5 (S209), initializes and creates the variable segment mapping table T8 (S210), and completes the processing of this routine.

Similarly, the MPPK #1 performs the processing from S211 to S216, and the MPPK #2 performs the processing from S217 to S222.

Figure 19:
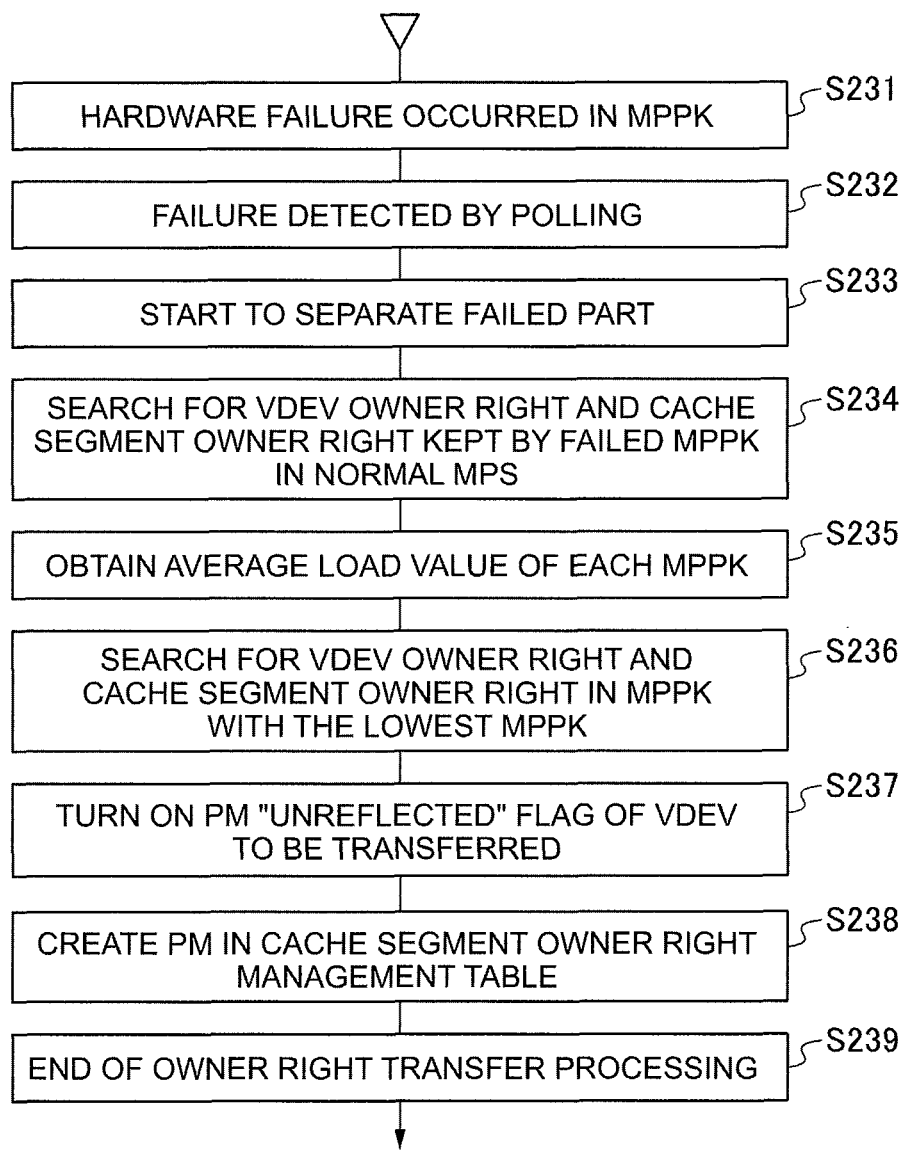
FIG. 19 is a flowchart showing the processing of updating a PM/SM cache management table at the time of an MPPK failure.

Next, the PM/SM cache management table updating processing at the time of an MPPK failure is described with reference to the flowchart in FIG. 19. This processing is performed by one Microprocessor MP with the lowest load among the normal Microprocessors MPs in the device. Firstly, the Microprocessor MP starts the processing under the condition that a hardware failure has occurred in an MPPK (S231), takes in the information from the other Microprocessors MPs by polling and detects the failure (S232), and separates the failed part (S233).

Subsequently, the Microprocessor MP refers to the cache segment ownership management table T3 and the VDEV ownership management table T1, searches for the VDEV ownership and the cache segment ownership kept by the MPPK where the failure has occurred (S234), as well as obtains the average load value of the MPPKs (S235), and with reference to the obtained information, performs the search for the purpose of allocating the VDEV ownership and the cache segment ownership kept by the MPPK where the failure has occurred to the MPPK with the lowest MPPK (S236). Subsequently, the MPPK performs the processing for turning the PM "Unreflected" flag on of the VDEV to be transferred (S237).

Next, one Microprocessor MP with the lowest load among the Microprocessors MPs in the transfer destination MPPK creates a cache segment ownership management table T3 (S238), completes the transfer processing of the cache segment ownership (S239), and completes the processing of this routine.

In this case, this routine, after completing the ownership transfer processing, asynchronously starts the processing of reflecting the newly allocated VDEV related information to the PM "Unreflected" flag or allocating the cache segment to the free slot. These types of processing are performed asynchronously to reduce the load caused by I/O processing.

Figure 20:
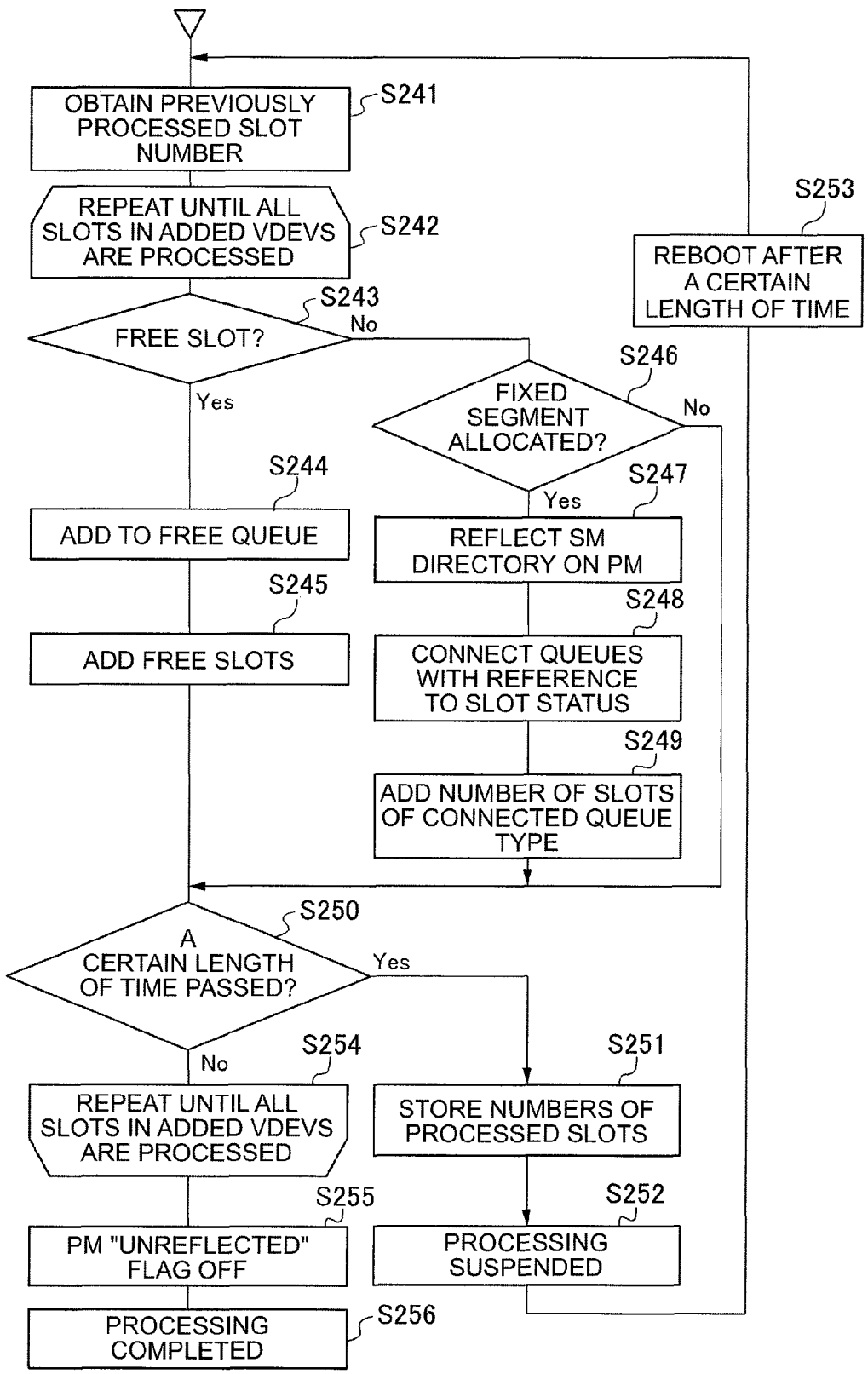
FIG. 20 is a flowchart showing the processing of asynchronous PM reflecting.

Next, the asynchronous PM reflecting processing at the time of an MPPK failure is described with reference to the flowchart in FIG. 20. This processing is performed by the Microprocessor MP in the transfer destination MPPK under the condition that the cache segment ownership has been changed due to an MPPK failure. Firstly, the Microprocessor MP obtains the previously processed slot number (S241), and repeats the processing until all the slots in the added VDEVs have been processed (S242). Subsequently, the Microprocessor MP determines whether the slot is free or not (S243), and if the slot is free, adds the information of the free queue to the queue management table T7 (S244), and adds the number of free slots to the slot number management table T6 (S245).

Meanwhile, if the slot is determined not to be free at step S243, the Microprocessor MP determines whether the fixed segment 130 is allocated or not (S246), and if it is allocated, reflects the information of the directory management table T9 on the directory management table T5 (S247), then refers to the queue management table T7, connects the queues in accordance with the slot status (S248), adds the number of slots of the connected queue type, updates the slot number management table T6 according to the added contents (S249), and determines whether a certain length of time has passed or not (S250).

If a certain length of time has passed after that, the Microprocessor MP stores the numbers of the processed slots (S251), then suspends the processing (S252), and performs a reboot after a certain length of time (S253), and returns to the step S241.

Meanwhile, if it is determined at step S250 that if a certain length of time has not passed, the Microprocessor MP repeats the above-mentioned processing until all the slots in the added VDEV have been processed (S254), turns off the PM "Unreflected" flag (S255) and completes the processing of this routine (S256).

That is, the processing of this routine can reduce the load accompanying I/O processing by suspending after a certain length of time and then rebooting. Furthermore, if all the slots in the transfer target VDEV have been processed, the processing is considered to be completed by turning off the PM "Unreflected" flag.

Furthermore, if it is determined at step S246 that the fixed segment is not allocated, the processing proceeds to the step S250 because no copy is performed in the variable segment. Furthermore, if the fixed area is allocated at step S246, the fixed segment 130 and the fixed segment 140 must be made corresponding with each other by one to one, for the processing from S247 to S249.

As mentioned above, in this embodiment, the Microprocessor Packages (MPPKs) 46 to 52 manage the information related to the VDEV ownership for controlling virtual devices (VDEVs) and the cache segment ownership for controlling the cache segments in units of Microprocessor Packages (MPPKs), and perform I/O processing (access) to accessible virtual devices (VDEVs) or accessible cache segments with reference to the information related to each ownership.

In this case, if the host computers 10 to 14 issue input/output requests to the virtual devices (VDEVs), Channel Adapter Packages 28 to 34 determine the Microprocessor Package (MPPK) to perform input/output processing for the virtual devices (VDEVs) from among the Microprocessor Packages (MPPKs) 46 to 52.

Specifically, when the Channel Adapter Packages 28 to 34 receive a data input/output request from the host computers 10 to 14 for inputting data to or outputting data from one virtual device among the multiple virtual devices (VDEVs), they determine the Microprocessor Package (MPPK) to handle the input/output processing of the one virtual device designated in the input/output request among the Microprocessor Packages (MPPKs) based on the first ownership stored in the shared memory 88, and transfer the input/output request of the one virtual device to the determined Microprocessor Package (MPPK).

One Microprocessor MP among multiple Microprocessors MPs 80 to 86 belonging to the determined Microprocessor Package (MPPK) searches the cache control information stored in the Package Memory (PM) 70 without searching the cache control information in the shared memory (SM) 88, and if data exists in the cache memory (CM) 90, accesses the cache memory (CM) 90, and if it does not, accesses the virtual devices (VDEVs).

Here, the Microprocessor Packages (MPPK) 46 to 52 determine whether data that is subject to the input/output request from the host computer exists in a cache area that is accessible by the Microprocessor Package based on the second ownership and the cache control information concerning data in the cache memory of the Microprocessor Package. If the Microprocessor Package determines that there is no data that is subject to the input/output request from the host computer, it transfers control information from the shared memory 88 to the Microprocessor Package, and determines once again whether there is data that is subject to the input/output request from the host computer.

This embodiment performs the input/output processing for the cache memory 90 by searching cache control information stored in the Package Memory (main memory) 70 without searching cache control information stored in the shared memory (SM) 88, which enables the high-speed input/output processing.

DESCRIPTION OF REFERENCE NUMERALS 10, 12, 14 host computers, 16 storage subsystem, 28, 30, 32, 34 Channel Adapter Packages, 36, 38 Disk Adapter Packages, 46, 48, 50, 52 Microprocessor Packages, 54, 56, 58, 60 Cache Memory Packages, 70 Package Memory, 72, 74, 76, 78 local memories, 62 HDDs, 88 shared memory, 90 cache memory

The invention claimed is:

1. A storage system coupled to one or more host computers, comprising:
a switch;
a plurality of storage devices providing a plurality of virtual devices to the host computers;
a plurality of first interfaces coupled to the switch and the host computers;
a plurality of second interfaces coupled to the switch and the storage devices;
a plurality of processor packages coupled to the switch,
each of the processor packages comprise one or more processors and a memory which is only accessed by the processors therein, each of the processors executing input/output processes to one or more of the virtual devices;
a cache memory coupled to the switch which temporarily stores data associated with the input/output process by the processor packages, the cache memory including a plurality of cache areas; and
a shared memory coupled to the switch which stores control information including cache control information used for accessing the cache memory, the control information being shared by all the processors of the processor packages,
wherein the memory in each of the processor packages stores the cache control information,
wherein each of the processor packages manages information related to a first owner right allocated thereto for indicating possession of an access right to one or more of the plurality of virtual devices, and a second owner right allocated thereto for indicating possession of an access right to one or more of the cache areas in the cache memory, the first owner right permitting a particular processor package to access a particular one or more virtual devices while excluding other processor packages from accessing the particular one or more virtual devices, and the second owner right permitting the particular processor package to access a particular one or more cache areas while excluding other processor packages from accessing the particular one or more cache areas, wherein, if the first interface receives an input/output request from one of the host computers to one of the virtual devices, the first interface transfers the input/output request to a first processor package having the first owner right to the virtual device to which the input/output request is directed, wherein the first processor package executes processing of the input/output request by accessing one or more of the cache areas to which the processor package has the second owner right thereto, by referring to the cache control information in the memory therein, wherein if the cache control information in the memory therein is updated with the processing, the cache control information in the shared memory is updated accordingly, wherein if the first owner right of one of the virtual devices is transferred from one of the processor packages to another of the processor packages, the another of the processor packages reflects the cache control information related to the one of the virtual devices in the shared memory to the cache control information in the memory of the another of the processor packages, wherein a hit ratio showing that there is data in the cache area of the cache memory is calculated for each of the plurality of processor packages, and wherein, if a difference in the hit ratio of each processor package exceeds a prescribed threshold value, the second owner right of the cache area handled by a processor package with a high hit ratio is changed by being allocated to a processor package with a low hit ratio.

2. The storage system according to claim 1,
wherein the shared memory includes:
a first fixed storage area for storing the cache control information; and
a first variable storage area for storing control information other than the cache control information; and
wherein the memory in each of the processor packages comprises:
a second fixed storage area for storing the cache control information and
a second variable storage area for storing the control information other than the cache control information.

3. The storage system according to claim 1,
wherein, if a virtual device is added, the first owner right of the added virtual device is set for a processor package with a low input/output processing load among the plurality of processing packages.

4. The storage system according to claim 1,
wherein, if a failure occurs in any processor package among the plurality of processor packages, a virtual device handled by the failed processor package is specified, and the first owner right of the virtual device is changed by being allocated to a processor package among normal processor packages with a low input/output processing load.

5. The storage system according to claim 1,
wherein an input/output processing load is measured for each of the plurality of processors of the plurality of processor packages, and an average value of an input/output processing load of a processor of each processor package is calculated, and
wherein, if a difference in a load of each processor package exceeds a prescribed threshold value, the first owner right of a virtual device handled by a processor package with a high load is changed by being allocated to a processor package with a low load.

* * * * *